(12) United States Patent
Kwak et al.

(10) Patent No.: US 12,120,747 B2
(45) Date of Patent: Oct. 15, 2024

(54) BEAM INDICATIONS DURING RANDOM ACCESS PROCEDURES

(71) Applicant: QUALCOMM Incorporated, San Diego, CA (US)

(72) Inventors: Yongjun Kwak, San Diego, CA (US); Wanshi Chen, San Diego, CA (US); Hung Dinh Ly, San Diego, CA (US); Jing Lei, San Diego, CA (US); Huilin Xu, Temecula, CA (US); Seyedkianoush Hosseini, San Diego, CA (US); Yuchul Kim, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/465,602

(22) Filed: Sep. 2, 2021

(65) Prior Publication Data
US 2022/0078852 A1 Mar. 10, 2022

Related U.S. Application Data

(60) Provisional application No. 63/074,656, filed on Sep. 4, 2020.

(51) Int. Cl.
*H04W 74/0833* (2024.01)
*H04W 24/08* (2009.01)
*H04W 76/10* (2018.01)

(52) U.S. Cl.
CPC ....... *H04W 74/0833* (2013.01); *H04W 24/08* (2013.01); *H04W 76/10* (2018.02)

(58) Field of Classification Search
None
See application file for complete search history.

(56) References Cited

U.S. PATENT DOCUMENTS

2018/0020487 A1* 1/2018 Tsai ................. H04W 72/0446
2018/0288645 A1* 10/2018 Lee ...................... H04B 17/382
(Continued)

FOREIGN PATENT DOCUMENTS

WO WO-2018182283 A1 10/2018

OTHER PUBLICATIONS

International Search Report and Written Opinion—PCT/US2021/049126—ISA/EPO—Dec. 21, 2021.

*Primary Examiner* — Ayanah S George
(74) *Attorney, Agent, or Firm* — Holland & Hart LLP

(57) ABSTRACT

Methods, systems, and devices for wireless communications are described. Generally, a user equipment (UE) may monitor multiple synchronization signal resources, each synchronization signal resource associated with a beam of a set of beams and may determine that multiple candidate beams of the set of beams satisfy a channel quality threshold. The UE may transmit an indication that the multiple candidate beams satisfy the channel quality threshold. For example, the UE may transmit a single random access message on a physical random access channel (PRACH) resource associated with multiple candidate beams, or may transmit multiple random access messages, each one on a different PRACH resource associated with a different candidate beam. The UE may receive an indication of one of the candidate beams from the base station and may establish a connection with the base station using the indicated candidate beam.

21 Claims, 18 Drawing Sheets

(56) References Cited

U.S. PATENT DOCUMENTS

| | | |
|---|---|---|
| 2019/0110314 A1 | 4/2019 | Abedini et al. |
| 2020/0128455 A1* | 4/2020 | Da Silva ........... H04W 36/0072 |
| 2020/0280946 A1* | 9/2020 | Guo .................. H04W 56/0045 |
| 2021/0105820 A1* | 4/2021 | Kim ....................... H04B 7/022 |

* cited by examiner

BEAM INDICATIONS DURING RANDOM ACCESS PROCEDURES

CROSS REFERENCE

The present Application for Patent claims the benefit of U.S. Provisional Patent Application No. 63/074,656 by KWAK et al., entitled "BEAM INDICATIONS DURING RANDOM ACCESS PROCEDURES," filed Sep. 4, 2020, assigned to the assignee hereof, and expressly incorporated by reference herein.

TECHNICAL FIELD

The following relates to wireless communications, including beam indications during random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, UEs may perform random access procedures to establish connections with and communicate with base stations.

SUMMARY

The described techniques relate to improved methods, systems, devices, and apparatuses that support beam indications during random access procedures. Generally, a user equipment (UE) may monitor multiple synchronization signal resources, each synchronization signal resource associated with a beam of a set of beams and may determine that multiple candidate beams of the set of beams satisfy a channel quality threshold. The UE may transmit an indication that the multiple candidate beams satisfy the channel quality threshold. For example, the UE may transmit a single random access message on a physical random access channel (PRACH) resource associated with multiple candidate beams, or may transmit multiple random access messages, each one on a different PRACH resource associated with a different candidate beam. The UE may receive an indication of one of the candidate beams from the base station and may establish a connection with the base station using the indicated candidate beam.

A method of wireless communications at a UE is described. The method may include monitoring a set of synchronization signal resources, each synchronization signal resource of the set of synchronization signal resources associated with a beam of a set of beams, determining, based on the monitoring, that multiple candidate beams of the set of beams satisfy a channel quality threshold, transmitting, as part of a random access procedure with a base station, an indication that the multiple candidate beams satisfy the channel quality threshold, receiving, based on transmitting the indication, an indication of a first beam of the multiple candidate beams, and establishing a connection with the base station via the first beam.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to monitor a set of synchronization signal resources, each synchronization signal resource of the set of synchronization signal resources associated with a beam of a set of beams, determine, based on the monitoring, that multiple candidate beams of the set of beams satisfy a channel quality threshold, transmit, as part of a random access procedure with a base station, an indication that the multiple candidate beams satisfy the channel quality threshold, receive, based on transmitting the indication, an indication of a first beam of the multiple candidate beams, and establish a connection with the base station via the first beam.

Another apparatus for wireless communications at a UE is described. The apparatus may include means for monitoring a set of synchronization signal resources, each synchronization signal resource of the set of synchronization signal resources associated with a beam of a set of beams, determining, based on the monitoring, that multiple candidate beams of the set of beams satisfy a channel quality threshold, transmitting, as part of a random access procedure with a base station, an indication that the multiple candidate beams satisfy the channel quality threshold, receiving, based on transmitting the indication, an indication of a first beam of the multiple candidate beams, and establishing a connection with the base station via the first beam.

A non-transitory computer-readable medium storing code for wireless communications at a UE is described. The code may include instructions executable by at least one processor to monitor a set of synchronization signal resources, each synchronization signal resource of the set of synchronization signal resources associated with a beam of a set of beams, determine, based on the monitoring, that multiple candidate beams of the set of beams satisfy a channel quality threshold, transmit, as part of a random access procedure with a base station, an indication that the multiple candidate beams satisfy the channel quality threshold, receive, based on transmitting the indication, an indication of a first beam of the multiple candidate beams, and establish a connection with the base station via the first beam.

In some examples of the method, apparatuses, and non-transitory computer-readable medium described herein, transmitting the indication that the multiple candidate beams satisfy the channel quality threshold may include operations, features, means, or instructions for identifying a random access resource associated with the multiple candidate beams of the set of beams, and transmitting, as part of the random access procedure with the base station, a first random access message on the identified random access resource.

Some examples of the method, apparatuses, and non-transitory computer-readable medium described herein may further include operations, features, means, or instructions for receiving, based on the monitoring, one or more synchronization signals over the set of synchronization signal resources, and performing one or more channel quality measurements on the one or more synchronization signals, where determining that the multiple candidate beams of the set of beams satisfy the channel quality threshold may be based on performing the one or more channel quality measurements.

Some examples of the method, apparatuses, and non-transitory computer-readable medium described herein may further include operations, features, means, or instructions for identifying, based on performing the one or more channel quality measurements, a first channel quality measurement value for the first beam of the multiple candidate beams, identifying, based on performing the one or more channel quality measurements, a second channel quality measurement value for the second beam of the multiple candidate beams, where the second channel quality measurement value may be less than the first channel quality measurement, and determining that a difference between the first channel quality measurement value and the second channel quality measurement value satisfies a channel quality difference threshold, where determining that the multiple candidate beams of the set of beams satisfy the channel quality threshold may be based on determining that the difference between the first channel quality measurement value and the second channel quality measurement value satisfies the channel quality difference threshold.

Some examples of the method, apparatuses, and non-transitory computer-readable medium described herein may further include operations, features, means, or instructions for identifying, based on performing the one or more channel quality measurement, a third channel quality measurement value for a third beam of the set of beams, determining that a difference between the first channel quality measurement value and the third channel quality measurement value does not satisfy the channel quality difference threshold, and determining, based on determining that the third channel quality measurement value does not satisfy the channel quality difference threshold, that the third beam of the set of beams may be not one of the multiple candidate beams of the set of beams that satisfy the signal quality threshold measurement value.

In some examples of the method, apparatuses, and non-transitory computer-readable medium described herein, the one or more channel quality measurements include reference signal received power (RSRP) measurements, reference signal received quality (RSRQ) measurements, or a combination thereof.

In some examples of the method, apparatuses, and non-transitory computer-readable medium described herein, transmitting the indication that the multiple candidate beams satisfy the channel quality threshold may include operations, features, means, or instructions for identifying a first random access resource associated with the first beam of the multiple candidate beams, transmitting a first random access message on the identified first random access resource, identifying a second random access resource associated with a second beam of the multiple candidate beams, and transmitting a second random access message on the identified second random access resource.

In some examples of the method, apparatuses, and non-transitory computer-readable medium described herein, receiving the indication of the first beam of the multiple candidate beams may include operations, features, means, or instructions for receiving, using the first beam, a first random access response message associated with the first random access message, and ignoring, based on receiving the first random access response message, a second random access response message associated with the second random access message.

Some examples of the method, apparatuses, and non-transitory computer-readable medium described herein may further include operations, features, means, or instructions for determining that the UE may be operating in a time-division duplex mode, where transmitting the first random access message on the identified first random access resource and transmitting the second random access message on the identified second random access resource may be based on determining that the UE may be operating in the time-division duplex mode.

In some examples of the method, apparatuses, and non-transitory computer-readable medium described herein, receiving the indication of the first beam of the multiple candidate beams may include operations, features, means, or instructions for receiving, as part of the random access procedure with the base station, a random access response message using the first beam.

Some examples of the method, apparatuses, and non-transitory computer-readable medium described herein may further include operations, features, means, or instructions for receiving, from the base station, a configuration message indicating one or more random access resources on which to transmit the indication that the multiple candidate beams satisfy the channel quality threshold.

A method of wireless communications at a base station is described. The method may include transmitting one or more synchronization signals over a set of synchronization signal resources, each synchronization signal resource of the set of synchronization signal resources associated with a transmit beam of a set of transmit beams, receiving, as part of a random access procedure with a UE, an indication that multiple candidate beams of the set of transmit beams satisfy a channel quality threshold, transmitting, based on receiving the indication, an indication of a first beam of the multiple candidate beams, and establishing a connection with the UE via the first beam.

An apparatus for wireless communications at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit one or more synchronization signals over a set of synchronization signal resources, each synchronization signal resource of the set of synchronization signal resources associated with a transmit beam of a set of transmit beams, receive, as part of a random access procedure with a UE, an indication that multiple candidate beams of the set of transmit beams satisfy a channel quality threshold, transmit, based on receiving the indication, an indication of a first beam of the multiple candidate beams, and establish a connection with the UE via the first beam.

Another apparatus for wireless communications at a base station is described. The apparatus may include means for transmitting one or more synchronization signals over a set of synchronization signal resources, each synchronization signal resource of the set of synchronization signal resources associated with a transmit beam of a set of transmit beams, receiving, as part of a random access procedure with a UE, an indication that multiple candidate beams of the set of transmit beams satisfy a channel quality threshold, transmitting, based on receiving the indication, an indication of a first beam of the multiple candidate beams, and establishing a connection with the UE via the first beam.

A non-transitory computer-readable medium storing code for wireless communications at a base station is described. The code may include instructions executable by at least one processor to transmit one or more synchronization signals over a set of synchronization signal resources, each synchronization signal resource of the set of synchronization signal resources associated with a transmit beam of a set of transmit beams, receive, as part of a random access procedure with a UE, an indication that multiple candidate beams of the set of transmit beams satisfy a channel quality threshold, transmit, based on receiving the indication, an indication of a first beam of the multiple candidate beams, and establish a connection with the UE via the first beam.

In some examples of the method, apparatuses, and non-transitory computer-readable medium described herein, receiving the indication that multiple candidate beams of the set of transmit beams satisfy the channel quality threshold may include operations, features, means, or instructions for identifying a random access resource associated with the multiple candidate beams of the set of beams, and receiving, as part of the random access procedure with the UE, a first random access message on the identified random access resource.

In some examples of the method, apparatuses, and non-transitory computer-readable medium described herein, receiving the indication that multiple candidate beams of the set of transmit beams satisfy the channel quality threshold may include operations, features, means, or instructions for receiving a first random access message on the first beam of the multiple candidate beams, and receiving a second random access message on a second beam of the multiple candidate beams.

In some examples of the method, apparatuses, and non-transitory computer-readable medium described herein, transmitting the indication of the first beam of the multiple candidate beams may include operations, features, means, or instructions for transmitting, as part of the random access procedure, a random access response message using the first beam.

Some examples of the method, apparatuses, and non-transitory computer-readable medium described herein may further include operations, features, means, or instructions for transmitting, to the UE, a configuration message indicating one or more random access resources on which to receive the indication that the multiple candidate beams satisfy the channel quality threshold.

DETAILED DESCRIPTION

Figure 1:
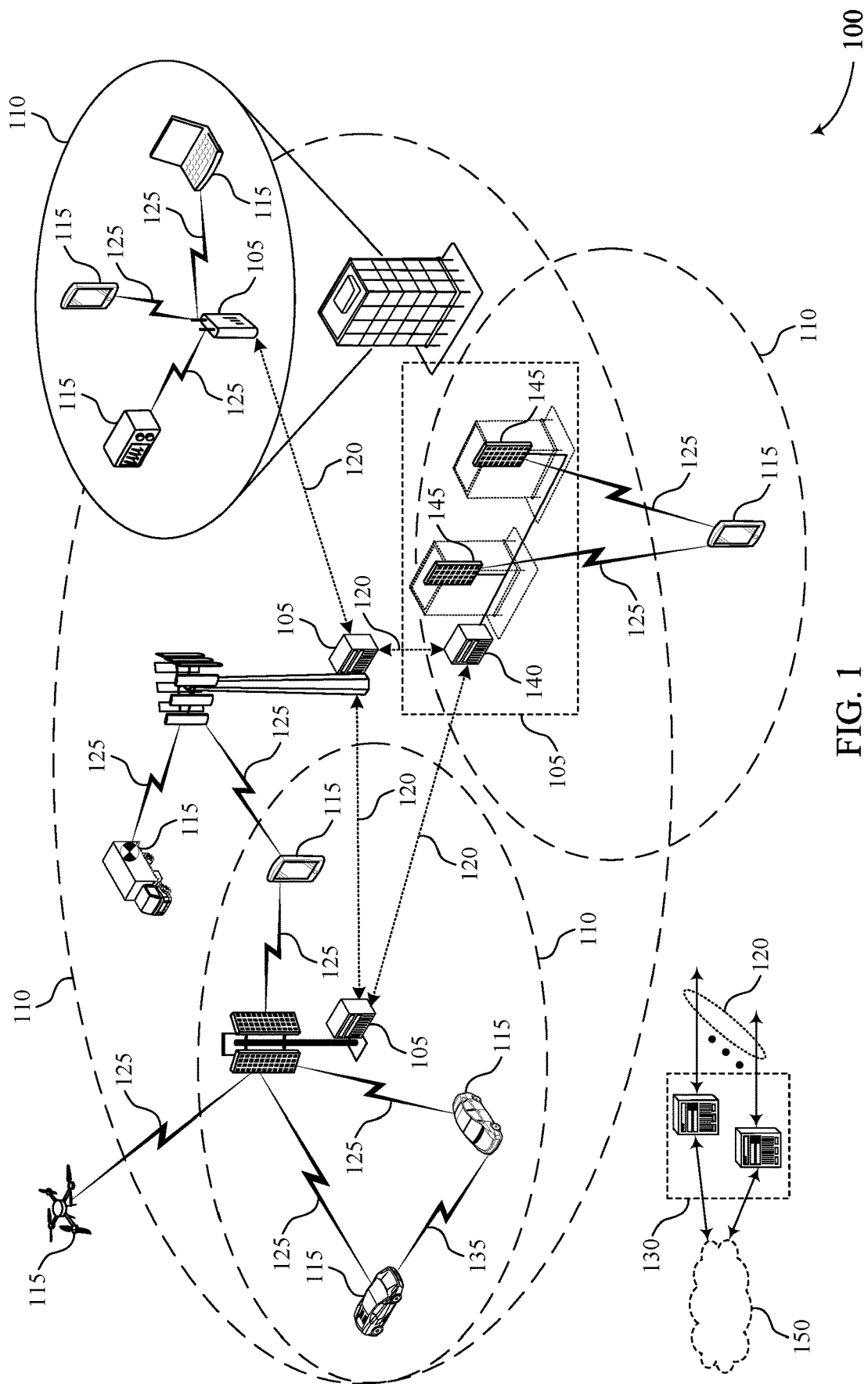
FIG. 1 illustrates an example of a system for wireless communications that supports beam indications during random access procedures in accordance with aspects of the present disclosure.

In some examples of a wireless communications system, a user equipment (UE) may establish a connection with a base station by performing random access procedure. For example, the UE may perform a two-step random access procedure or a four-step random access procedure. The UE may monitor for synchronization signal blocks (SSBs) over multiple beams and may identify a preferred beam for communicating with the base station. The UE may transmit a first random access message in the random access procedure, the random access message including an indication of the preferred beam. However, in some cases, the base station may not have sufficient resources available to schedule downlink communications (e.g., subsequent random access messages) on the preferred beam due to over-loading, system congestion, or channel quality. In such examples, the base station may schedule communications on the indicated beam after a delay. Additionally, or alternatively, if the preferred beam is not currently available, the base station may schedule communications on a different beam (e.g., a randomly or arbitrarily selected beam) until the preferred beam is available. This may result in increased system latency, increased communication delays, failed communications, or decreased user experience.

To avoid such issues, the UE may transmit an indication of multiple candidate beams on which the base station may communicate with the UE. For example, the UE may transmit a single random access message on a physical random access channel (PRACH) resource associated with multiple candidate beams, or may transmit multiple random access messages, each one on a different PRACH resource associated with a different candidate beam. The UE may receive an indication of one of the candidate beams from the base station (e.g., may receive a random access message on one of the candidate beams) and may establish a connection with the base station using the indicated candidate beam.

Particular aspects of the subject matter described herein may be implemented to realize one or more advantages. The described techniques may support improvements in system efficiency such that a UE may indicate multiple candidate beams for completing a random access procedure, establishing a connection, or both. A base station may flexibly select a candidate beam based on the indication of multiple candidate beams. This may allow UEs and base stations to decrease system latency, avoid system congestion, avoid failed random access procedures, or improve user experience. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to random access schemes and process flows. Aspects of the disclosure are further illustrated by and described with reference to apparatus diagrams, system diagrams, and flowcharts that relate to beam indications during random access procedures.

FIG. 1 illustrates an example of a wireless communications system 100 that supports beam indications during random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, or integrated access and backhaul (IAB) nodes), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2 or Xn) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, or a Home eNodeB.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, or user data. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, or a hot spot, or any combination thereof. The term "cell" may refer to a logical communication entity used for communication with a base station 105 (e.g., over a carrier) and may be associated with an identifier for distinguishing neighboring cells (e.g., a physical cell identifier (PCID), or a virtual cell identifier (VCID)). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, or beam selection signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, or beam selection signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 maybe examples of smartphones (e.g., eMBB devices), ultra-reliable low latency communication (URLLC) capable devices, vehicles, or vehicle-mounted devices (e.g., vehicle-to-everything (V2X) devices). Some examples of wireless communications systems (e.g., 5G systems) may be scalable and deployable in efficient and cost-effective ways. Some examples of wireless communications system may include UEs 115 with reduced capabilities (RedCap) UEs 115, which may function under relaxed peak throughput, latency, and reliability requirements. In some examples, wireless communications systems may include UEs 115 with additional reduced capabilities that support low power wide area (LPWA) use cases. Such systems may support improvements to coverage, complexity, and power consumption at UEs 115. In some examples, UEs 115 may include, for instance, metering devices, asset tracking, or personal internet-of-things (IoT) devices.

In some cases, a UE 115 may monitor multiple synchronization signal resources, each synchronization signal resource associated with a beam of a set of beams and may determine that multiple candidate beams of the set of beams satisfy a channel quality threshold. The UE 115 may transmit an indication that the multiple candidate beams satisfy the channel quality threshold. For example, the UE 115 may transmit a single random access message on a physical random access channel (PRACH) resource associated with multiple candidate beams, or may transmit multiple random access messages, each one on a different PRACH resource associated with a different candidate beam. The UE 115 may receive an indication of one of the candidate beams from the base station 105 and may establish a connection with the base station using the indicated candidate beam.

Figure 2:
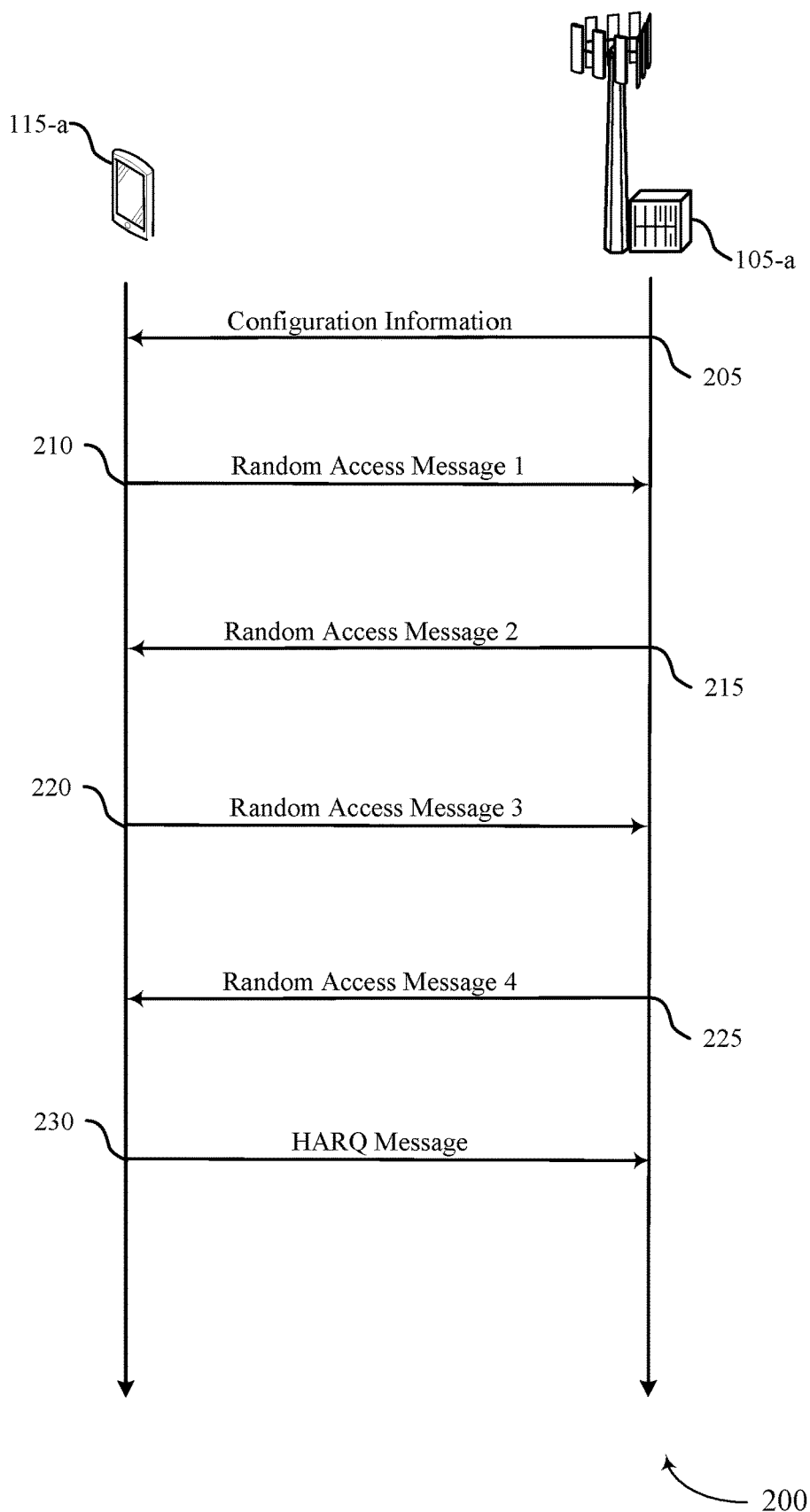
FIG. 2 illustrates an example of a process flow that supports beam indications during random access procedures in accordance with aspects of the present disclosure.

FIG. 2 illustrates an example of a process flow 200 that supports beam indications during random access procedures in accordance with aspects of the present disclosure. In some examples, process flow 200 may implement aspects of wireless communications system 100. Process flow 200 may include a UE 115-a, and a base station 105-a, which may be examples of corresponding devices described with reference to FIG. 1. UE 115-a may be a RedCap UE, a LPWA capable UE, a metering device, an asset tracking device, or a personal IoT device.

UE 115-a may establish a communication link with base station 105-a by using a four-step random access procedure. In such cases, UE 115-a may transmit at least two random access messages (e.g., random access message 1 and random access message 3) and base station 105-a may transmit at least two random access messages (e.g., RACH message 2 and RACH message 4).

At 205, base station 105-a may transmit configuration information to UE 115-a. The configuration information may include SSB configuration (e.g., including resource allocation for SSBs, timing information, or an indication of beams associated with respective SSBs), reference signal configuration information, or PRACH resource configuration. In some examples, base station 105-a may transmit the configuration information in system information or radio resource control (RRC) signaling. In some examples, configuration information 205 or another configuration message may include channel quality threshold information, or channel quality threshold measurement difference threshold information.

At 210, UE 115-a may initiate a random access procedure by transmitting random access message 1 (e.g., RACH msg 1). In some cases, random access message 1 may include a RACH preamble. In one example, the RACH preamble may carry a random access radio network temporary identifier (RA-RNTI). As shown, UE 115-a may transmit random access message 1 to base station 105-a.

In some examples, UE 115-a may select a beam for transmitting random access message 1 based on receiving one or more SSBs. For example, UE 115-a may monitor for and receive multiple SSBs, each SSB transmitted by base station 105-a on a different transmit beam. UE 115-a may select a preferred beam of the various transmit beams and may transmit random access message 1 on PRACH resources that correspond to the preferred beam. Base station 105-a may determine which of the beams is the preferred beam based on which PRACH resources over which base station 105-a receives random access message 1.

However, in some cases, base station 105-a may not have sufficient resources to schedule downlink communications (e.g., subsequent random access messages) on a preferred beam due to over-loading, system congestion, or channel quality. In such examples, base station 105-a may schedule communications on the indicated beam after a delay. Additionally, or alternatively, if the preferred beam is not currently available, base station 105-a may schedule communications on a different beam (e.g., a randomly or arbitrarily selected beam) until the preferred beam is available. This may result in increased system latency, increased communication delays, failed communications, or decreased user experience. To avoid such issues, UE 115-a may transmit (e.g., in random access message 1) an indication of multiple candidate beams on which base station 105-a may communicate with UE 115-a. Indications of multiple candidate beams are described in greater detail with reference to FIGS. 4-6.

Upon receiving random access message 1, base station 105-a may decode random access message 1 (e.g., a RACH preamble) and may obtain the RA-RNTI. In some cases, the RA-RNTI may be calculated from a resource used to transmit the RACH preamble. For instance, base station 105-a may utilize the time and frequency allocation of the preamble resource to calculate the RA-RNTI.

At 215, base station 105-a may transmit random access message 2 (e.g., msg 2). Random access message 2 may include control signaling (e.g., via a physical downlink control channel (PDCCH)) and a physical uplink shared channel (PDSCH) carrying a payload with the contents of the message. Random access message 2 may include a RACH preamble response. The RACH preamble response may include information for UE 115-a. For example, the RACH preamble response may include an uplink grant to UE 115-a, a temporary cell radio network temporary identifier (TC-RNTI), a resource block (RB) assignment, and a modulation coding scheme (MCS) configuration. Additionally, base station 105-a may configure itself to receive random access message 3 (e.g., msg 3) using the information included in random access message 2. UE 115-a may receive random access message 2 and may decode random access message 2 (e.g., RACH preamble response) and obtain the information included in random access message 2. The included information may enable UE 115-a to transmit random access message 3 at 220.

At 220, UE 115-a may utilize information received in random access message 2 (e.g., the received TC-RNTI and uplink grant) to transmit a corresponding random access message 3 (e.g., on a PUSCH). RACH message 3 may include a radio RRC connection request. Base station 105-a may receive random access message 3 and decode random access message 3 to generate random access message 4 (e.g., msg 4) using the received information (e.g., the RRC connection request).

At 225, base station 105-a may transmit random access message 4 that may include an RRC connection setup corresponding to UE 115-a (e.g., the RRC connection setup may be associated with a TC-RNTI of UE 115-a). Random access message 4 may include control signaling (e.g., on a PDCCH) and data for the random access message (e.g., on a PDSCH). Random access message 4 may also include a cell radio network temporary identifier (CRNTI) for future communication with UE 115-a. For instance, after random access message 4, UE 115-a and base station 105-a may communicate using the CRNTI.

At 230, UE 115-a may transmit a hybrid automatic request (HARQ) message (e.g., an acknowledgement (ACK) message or a negative acknowledgement (NACK) message) to base station 105-a indicating whether UE 115-a successfully received RACH message 4 at 225.

In some examples, a UE 115-a and base station 105-a may perform a two-step random access procedure described with reference to FIG. 3.

Figure 3:
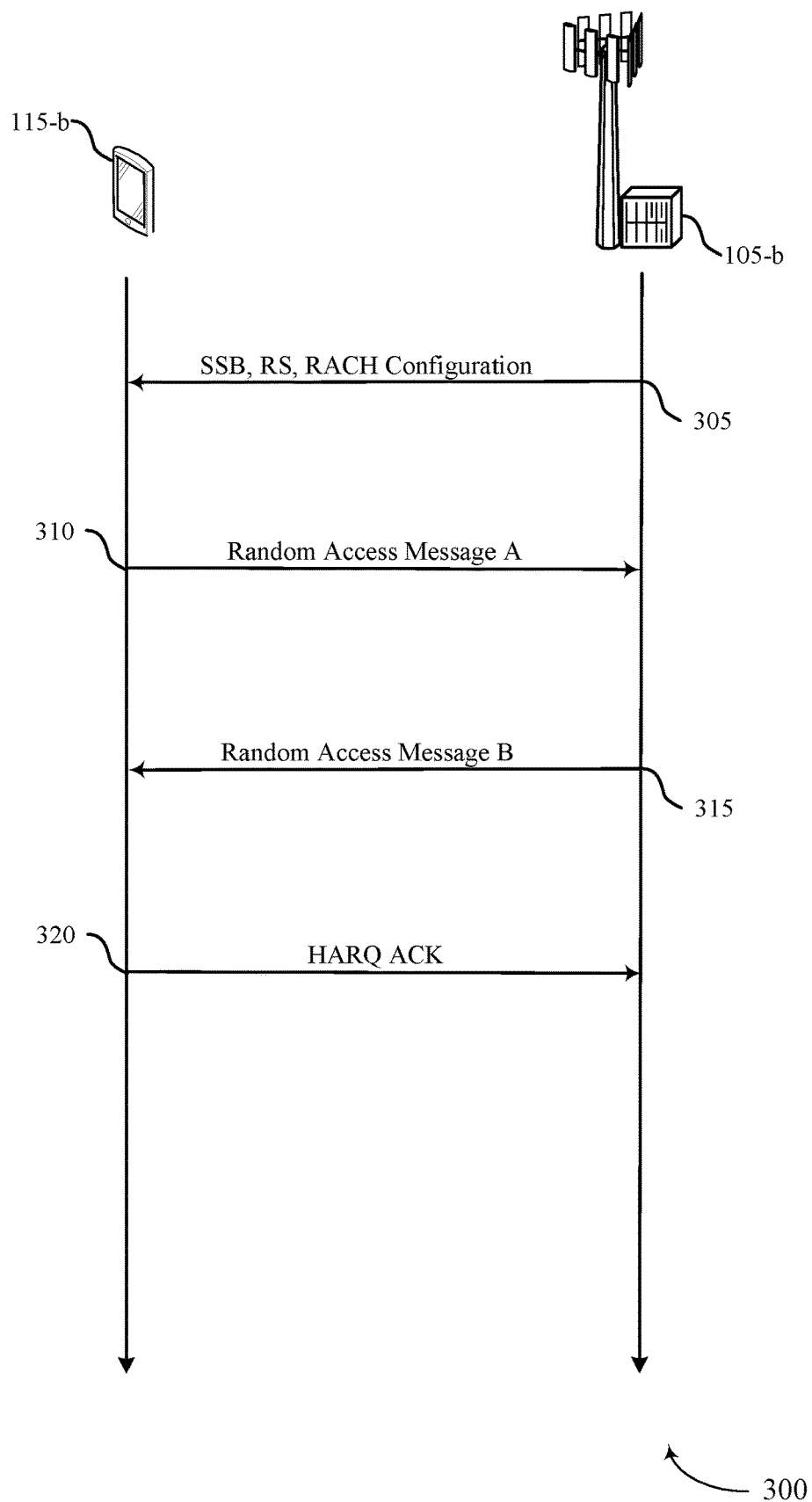
FIG. 3 illustrates an example of a process flow that supports beam indications during random access procedures in accordance with aspects of the present disclosure.

FIG. 3 illustrates an example of a process flow 300 that supports beam indications during random access procedures in accordance with aspects of the present disclosure. In some examples, process flow 300 may implement aspects of wireless communications system 100. Process flow 300 may include a UE 115-b, and a base station 105-b, which may be examples of corresponding devices described with reference to FIGS. 1 and 2. UE 115-a may be a RedCap UE, a LPWA capable UE, a metering device, an asset tracking device, or a personal IoT device.

UE 115-b may establish a communication link between UE 115-b and base station 105-b by a two-step random access procedure. In such cases, UE 115-b may transmit a first random access message (e.g., message A) and base station 105-b may transmit a second RACH message (e.g., message B).

At 305, base station 105-a may transmit configuration information to UE 115-a. The configuration information may include SSB configuration (e.g., including resource allocation for SSBs, timing information, or an indication of beams associated with respective SSBs), reference signal configuration information, or PRACH configuration. In some examples, base station 105-a may transmit the configuration information in system information, or RRC signaling. In some examples, configuration information 305 or another configuration message may include channel quality threshold information, or channel quality threshold measurement difference threshold information.

At 310, UE 115-b may transmit a first random access message (e.g., random access message A), to base station 105-b. Random access message A may combine the contents of a random access message 1 and random access message 3 from a four-step RACH procedure (e.g., the four-step random access procedure described with reference to FIG. 2). In some cases, random access message A may include a RACH preamble (e.g., random access message 1 from FIG. 2) and a PUSCH carrying a payload with the contents of the message (e.g., random access message 3 from FIG. 2). In some cases, the preamble and the payload of random access message A may be transmitted on separate waveforms. Random access message A may include a preamble portion (e.g., a RACH preamble as described in FIG. 2) and a payload portion (e.g., a PUSCH payload).

In some examples, UE 115-b may select a beam for transmitting message 1 based on receiving one or more SSBs. For example, UE 115-b may monitor for and receive multiple SSBs, each SSB transmitted by base station 105-b on a different transmit beam. UE 115-b may select a preferred beam of the various transmit beams and may transmit random access message A on PRACH resources that correspond to the preferred beam. Base station 105-b may determine which of the beams is the preferred beam based on which RACH resources over which base station 105-b receives RACH message 1.

However, in some cases, base station 105-b may not have sufficient resources to schedule on a preferred beam due to over-loading, system congestion, or channel quality. In such examples, base station 105-b may schedule communications on the indicated beam after a delay. Additionally, or alternatively, if the preferred beam is not currently available, base station 105-b may schedule communications on a different beam (e.g., a randomly or arbitrarily selected beam) until the preferred beam is available. This may result in increased system latency, increased communication delays, failed random access procedures, failed communications, or decreased user experience. To avoid such issues, UE 115-b may transmit (e.g., in random access message A) an indication of multiple preferred beams on which to communicate with base station 105-b. Indications of multiple preferred or candidate beams are described in greater detail with reference to FIGS. 4-6.

At 315, base station 105-b may transmit a random access message B. For instance, base station 105-b may transmit a downlink control signal (e.g., on a PDCCH) and a corresponding second RACH message (e.g., random access message B) on a PDSCH to UE 115-b, where RACH message B may combine the equivalent contents of a RACH message 2 and message 4 from four-step RACH (e.g., RACH message 2 and RACH message 4 of FIG. 2). In some examples of two-step random access procedures, base station 105-b may transmit message B using either broadcast methods (e.g., targeting multiple UEs including UE 115-b) or unicast methods (e.g., targeting one or more specific UEs such as at least UE 115-b). Random access message B may include multiple portions or information, or both. For example, random access message B may include a preamble response portion, a contention resolution portion, an RRC connection setup message, or a combination thereof. Random access message B may also include other information provided by base station 105-b to UE 115-b, such as timing advance information.

Figure 4:
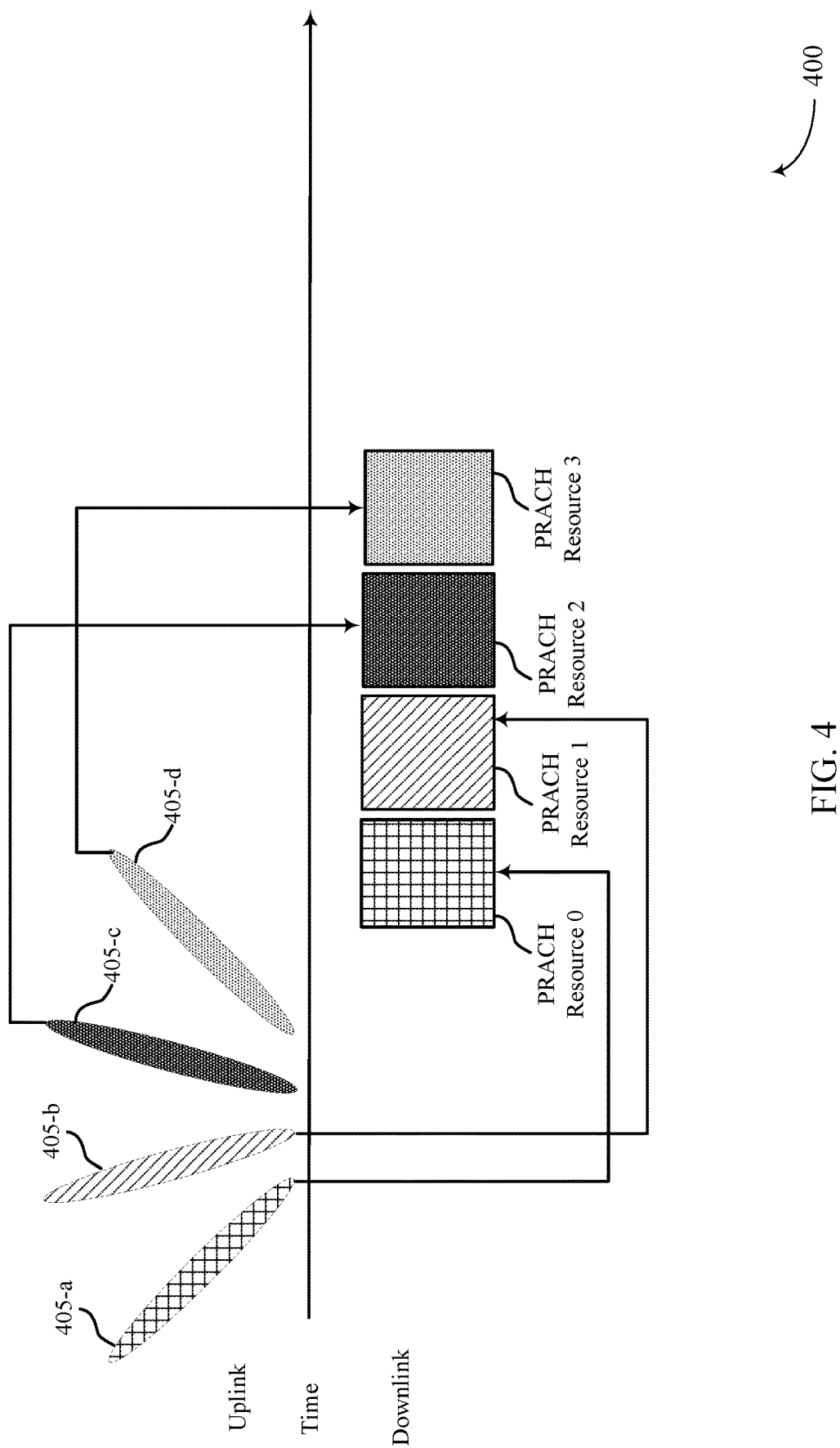
FIG. 4 illustrates an example of a random access scheme that supports beam indications during random access procedures in accordance with aspects of the present disclosure.

FIG. 4 illustrates an example of a random access scheme 400 that supports beam indications during random access procedures in accordance with aspects of the present disclosure. In some examples, random access scheme 400 may implement aspects of wireless communications system 100. A UE 115 and a base station 105, which may be examples of corresponding devices described with reference to FIGS. 1-3, may implement aspects of random access scheme 400.

A base station 105 may transmit SSBs over various beams 405. For instance, base station 105 may transmit SSB with an index SSB0 on beam 405-a, an SSB with an index SSB1 on beam 405-*b*, an SSB with an index SSB2 on beam 405-*c*, and an SSB with an index SSB 3 on beam 405-*d*. A UE 115 may monitor SSB resources for the SSBs.

UE 115 may determine a preferred beam 405 from a set of beams (e.g., beam 405-*a*, beam 405-*b*, beam 405-*c*, and beam 405-*d*). For instance, UE 115 may perform one or more channel quality measurements (e.g., reference signal received power or reference signal receive quality (RSRQ)) on the SSBs received over the four beams (e.g., or any other number of beams consistent with techniques described herein). UE 115 may determine which of the beams has the highest channel quality measurement value or satisfies a threshold value. In some examples, base station 105 may configure a channel quality threshold to which UE 115 may compare channel quality measurements. If channel quality measurements for only one SSB (e.g., beam 405) satisfies the configured threshold, then UE 115 may select that beam 405 as the preferred beam. If channel quality measurements for multiple SSBs satisfy the configured threshold, then UE 115 may select one of the beams 405 that satisfy the configured threshold as the preferred beam 405 (e.g., UE 115 may randomly select one of the beams 405, may select a first measured beam 405, a lowest or highest index value, or may pick the beam 405 associated with the highest channel quality measurement value). If none of the SSBs satisfy the configured threshold, then UE 115 may select one of the beams 405 that do not satisfy the configured threshold (e.g., UE 115 may randomly select one of the beams 405, may select a first measured beam 405, a lowest or highest index value, or may pick the beam 405 associated with the highest channel quality measurement value).

UE 115 may indicate a preferred beam to base station 105 by selecting a physical random access channel (PRACH) resource associated with the preferred beam. PRACH resources may be mapped to SSB indices (e.g., beams 405) at a one-to-one ratio For instance, PRACH resource 0 may be mapped to SSB0 (e.g., and corresponding beam 405-*a*), PRACH resource 1 may be mapped to SSB1 (e.g., and corresponding to beam 405-*b*), PRACH resource 2 may be mapped to SSB2 (e.g., and corresponding to beam 405-*c*), and PRACH resource 3 may be mapped to SSB3 (e.g., and corresponding to beam 405-*d*). Thus, UE 115 may transmit a first random access message (e.g., message 1 in a four-step RACH procedure or message A in a two-step RACH procedure) on a PRACH resource that is mapped to the preferred beam. For instance, if UE 115 selects beam 405-*a* as a preferred beam based on the channel quality measurements, then UE 115 may transmit a first random access message (e.g., in a four-step RACH procedure or a two-step RACH procedure) on PRACH resource 0.

Base station 105 may receive the random access message on the selected PRACH resource and may determine the preferred transmit beam 405 for communicating with UE 115 based on the PRACH resource. Base station 105 may transmit subsequent transmissions (e.g., subsequent RACH transmissions or communications over an established link) using the preferred beam 405.

However, in some examples, as described herein, base station 105 may not have sufficient available resources for the chosen beam (e.g., due to overloading or system congestion). In such cases, base station 105 may not be able to properly or efficiently schedule UE 115. For instance, base station 105 may wait to schedule UE 115 until the indicated preferred beam 405 is available, which may result in time delays for UE 115, increased system congestion and latency, excessive power expenditures and decreased battery life (e.g., for a UE 115 waiting for downlink transmissions or random access messages), or failed random access procedures. In some examples, base station 105 may randomly select another beam 405 on which to communicate with UE 115 instead of the preferred beam 405. This may result in failed communications with UE 115, increased retransmissions, increased system congestion, or failed random access procedures.

In some examples, UE 115 may indicate multiple beams 405 on which base station 105 may successfully communicate with UE 115. Indications of multiple candidate beams 405 (e.g., instead of only one preferred beam) may provide additional flexibility to base station 105 for scheduling subsequent communications with UE 115. For example, base station 105 may use this information to schedule upcoming communications or channels (e.g., including subsequent random access messages in a two-step random access procedure or a four-step random access procedure) on an available candidate beam 405 (e.g., even if a preferred beam 405 is currently unavailable).

In some examples, as described in greater detail with reference to FIG. 5, UE 115 may transmit an indication of multiple SSBs corresponding to multiple beams 405 for communicating with UE 115 using PRACH resource partitioning. For instance, SSB-RO mapping may be based on a many-to-one mapping. In such cases, UE 115 may identify multiple SSBs that satisfy a configured channel quality measurement threshold and may select a PRACH resource that is associated with the multiple identified SSBs. In some examples, UE 115 may identify a best SSB, and may determine if any channel quality measurement values for other SSBs are within a threshold difference from the channel quality measurement value of the best SSB. If so, the UE 115 may select a PRACH resource associated with those SSBs for transmission of a first random access message. Such resource partitioning is described in greater detail with reference to FIG. 5. In some examples, configuration information 305 or another configuration message may include an indication of a many-to-one mapping relationship between the SSBs and the PRACH resources. Base station 105 may indicate such configuration information, including the mapping relationship via system information, or radio resource control (RRC) signaling.

In some examples, UE 115 may transmit multiple random access messages on multiple PRACH resources to indicate multiple candidate beams 405. For instance, base station 105 may configure PRACH resources with a one-to-one mapping to SSB indices, as illustrated with reference to FIG. 4. UE 115 may perform one or more channel quality measurements on the SSBs received over multiple beams 405. For instance, UE 115 may measure RSRP or RSRQ on each SSB. In some examples, UE 115 may compare the channel quality measurement values with a threshold channel quality measurement value (e.g., configured by base station 105). Or, UE 115 may identify a best SSB, and may determine if any channel quality measurement values for other SSBs are within a threshold difference from the channel quality measurement value of the best SSB. In either case, UE 115 may identify multiple candidate SSBs associated with respective candidate beams 405 for receiving communications from base station 105. If UE 115 only identifies a single SSB as a best beam or a beam that satisfies a threshold, then UE 115 may transmit a first random access message (e.g., a random access message 1 or a random access message A) on the PRACH resource associated with that SSB. However, if UE 115 identifies multiple candidate SSBs associated with respective candidate beams 405, then UE 115 may transmit multiple random access messages on multiple PRACH resources. For instance, UE 115 may identify SSB0 received on beam 405-*a* as satisfying a channel quality measurement value threshold or as a best SSB, or both. UE 115 may also determine that SSB1 satisfies the channel quality measurement value threshold, or that a channel quality measurement value for SSB1 is within a threshold difference from the channel quality measurement value of SSB0. UE 115 may indicate, to base station 105, that both beam 405-*a* and beam 405-*b* may be useable for subsequent communication.

In some examples, UE 115 may transmit a first random access message on PRACH Resource 0 (mapped to SSB0) and may transmit a second random access message on PRACH resource 1 (mapped to SSB1). Both the first random access message and the second random access message may be copies of a random access message 1 or a random access message A. Upon receiving the first random access message on PRACH resource 0 and the second random access message on PRACH resource 1, base station 105 may determine that both transmit beam 405-*a* and transmit beam 405-*b* are candidate beams and are suitable for subsequent communications with UE 115. For instance, if transmit beam 405-*a* is unavailable (e.g., due to overloading), then base station 105 may transmit a downlink random access message (e.g., a message B of a two-step random access procedure or a message 2 of a four-step random access procedure) using transmit beam 405-*b*.

In some examples, base station 105 may transmit random access responses on multiple transmit beams 405. For instance, base station 105 may transmit a random access response on both transmit beam 405-*a* and transmit beam 405-*b* (e.g., responsive to receiving a random access message on PRACH resource 1 and a random access message on PRACH resource 1). In such examples, UE 115 may decode and use the first successfully received random access response and may ignore additional random access response receptions. For instance, UE 115 may receive a random access response on beam 405-*a*. Subsequently, UE 115 may receive another random access response on beam 405-*b*. In such cases, UE 115 may decode the first random access response received on beam 405-*a* and may ignore the subsequently received random access response. For subsequent communications, UE 115 and base station 105 may communicate using beam 405-*a*.

In some examples, UE 115 may only transmit multiple random access messages on multiple PRACH resources in a time-division multiplexing (TDM) scenario. For instance, UE 115 may determine that it is operating in a TDM mode and may send the multiple random access responses on multiple PRACH resources based on the determining. However, if UE 115 is not operating in a TDM mode, then UE 115 may refrain from transmitting multiple random access messages on multiple PRACH resources and may instead only send a random access message on a single PRACH resource (e.g., corresponding to a best SSB).

In some examples, UE 115 may indicate multiple candidate beams based on many-to-one mapping of SSBs to PRACH resources, as described in greater detail with reference to FIG. 5.

Figure 5:
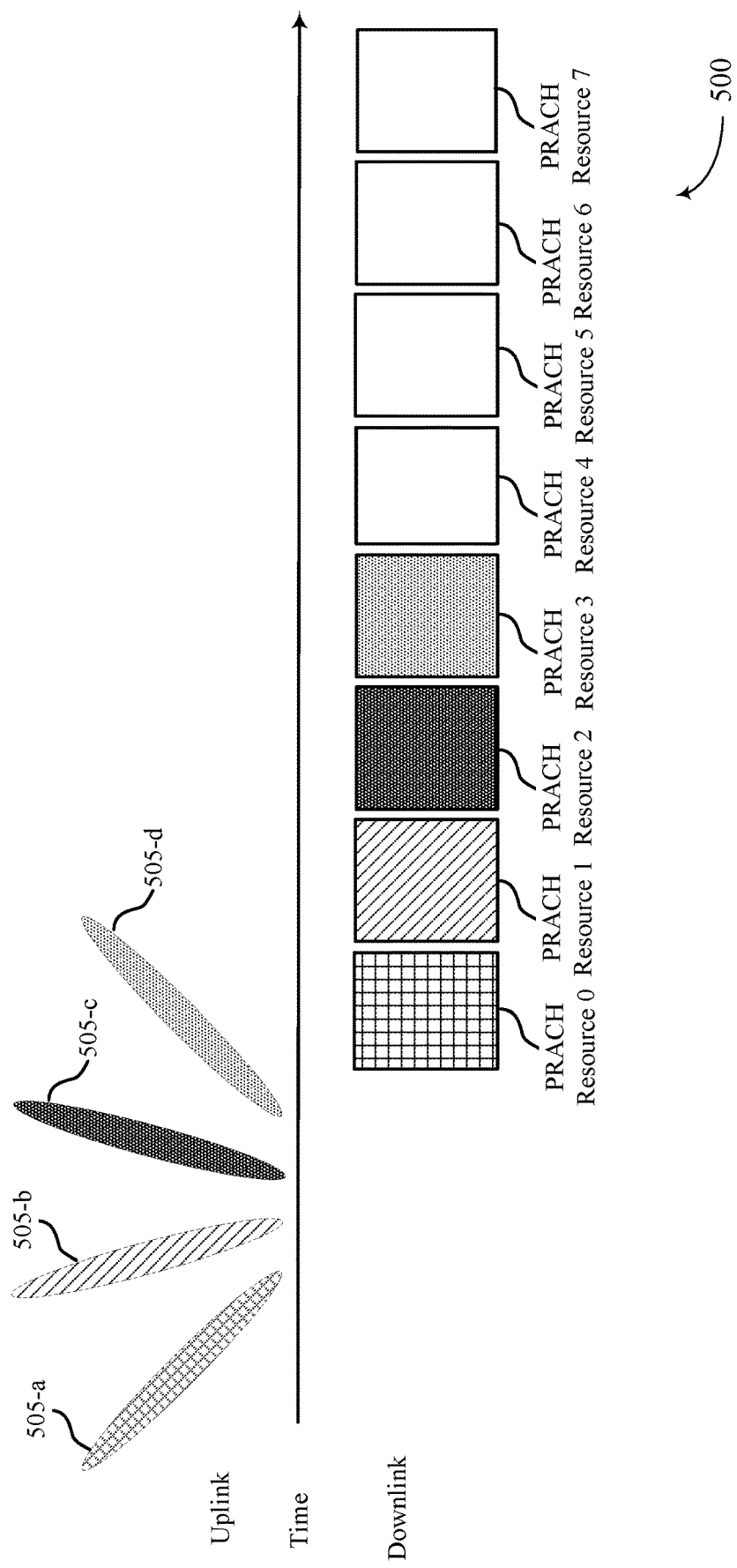
FIG. 5 illustrates an example of a random access scheme that supports beam indications during random access procedures in accordance with aspects of the present disclosure.

FIG. 5 illustrates an example of a random access scheme 500 that supports beam indications during random access procedures in accordance with aspects of the present disclosure. In some examples, a random access scheme 500 may implement aspects of wireless communications system 100. A UE 115 and a base station 105, which may be examples of corresponding devices described with reference to FIGS. 1-4, may implement aspects of random access scheme 500.

In some cases, a base station 105 may configure PRACH resources for transmitting a first random access message (e.g., a message 1 in a four-step random access procedure or a message A in a two-step random access message). The PRACH resources may be mapped to SSBs received over multiple beams 505. For instance, PRACH resource 0 may be mapped to SSB0 (e.g., and corresponding beam 505-*a*), PRACH resource 1 may be mapped to SSB1 (e.g., and corresponding to beam 505-*b*), PRACH resource 2 may be mapped to SSB2 (e.g., and corresponding to beam 505-*c*), and PRACH resource 3 may be mapped to SSB3 (e.g., and corresponding to beam 505-*d*). Thus, UE 115 may transmit a first random access message (e.g., in a four-step RACH procedure or a two-step RACH procedure) on a PRACH resource that is mapped to the preferred beam. For instance, if UE 115 selects beam 505-*a* as a preferred beam based on the channel quality measurements, then UE 115 may transmit a first random access message (e.g., message 1 in a four-step random access procedure or a message A in a two-step random access procedure) on PRACH resource 0.

Additionally, PRACH resources may be partitioned and SSBs may be mapped to the PRACH resources at a many-to-one ratio, such that a multiple SSBs are mapped to a single PRACH resource. For instance, PRACH resource 4 may be mapped to SSB0 and SSB1 (e.g., and may correspond to beam 505-*a* and beam 505-*b*), PRACH resource 5 may be mapped to SSB1 and SSB2 (e.g., and may correspond to beam 505-*b* and beam 505-*c*), PRACH resource 6 may be mapped to SSB 2 and SSB 3 (e.g., and may correspond to beam 505-*c* and beam 505-*d*), and PRACH resource 7 may be mapped to SSB 3 and SSB 0 (e.g., and may correspond to beam 505-*d* and beam 505-*a*). Thus, UE 115 may identify multiple beams for subsequent communication with base station 105 and may transmit a first random access message (e.g., in a four-step random access procedure or a two-step random access procedure) on a PRACH resource that is mapped to the multiple candidate beams. For instance, UE 115 may select beam 505-*b* and beam 505-*c* as candidate beams and may transmit the first random access message on PRACH resource 5, which corresponds to SSB 1 and SSB2. Additional PRACH resources may be allocated (or the same set of PRACH resources may be divided or subdivided) to accommodate indications of any number of candidate beams 505 (e.g., three beams 505, four beams 505, or any other number of beams that satisfy a given criteria for preferred or useable candidate beams 505).

UE 115 may receive SSBs sent by base station 105 over multiple transmit beams 505. UE 115 may perform one or more channel quality measurements on the SSBs received over multiple beams 505. For instance, UE 115 may measure RSRP or RSRQ for each SSB. In some examples, UE 115 may compare the channel quality measurement values with a threshold channel quality measurement value (e.g., configured by base station 105). Or, UE 115 may identify a best SSB, and may determine if any channel quality measurement values for other SSBs are within a threshold difference from the channel quality measurement value of the best SSB. In either case, UE 115 may identify multiple SSBs associated with candidate beams 405 for communicating with base station 105. If UE 115 only identifies a single SSB, then UE 115 may transmit a random access message on the PRACH resource associated with only that SSB (e.g., PRACH resource 0, PRACH resource 1, PRACH resource 2, or PRACH resource 3). For instance, if UE 115 identifies only beam SSB 0 as a candidate SSB, then UE 115 may transmit a first random access message on PRACH resource 0, indicating that only beam 505-*a* is a candidate beam.

However, if UE 115 identifies multiple candidate SSBs associated with multiple candidate beams 505, then UE 115 may transmit a random access message on a PRACH resource associated with the multiple candidate beams 505. For instance, UE 115 may identify SSB0 received on beam 505-*a* as satisfying a channel quality measurement value threshold or as a best SSB, or both. UE 115 may also determine that SSB1 satisfies the channel quality measurement value threshold, or that a channel quality measurement value for SSB1 is within a threshold difference from the channel quality measurement value of SSB0. UE 115 may indicate, to base station 105, that both beam 405-*a* and beam 405-*b* are candidate beams that may be useable for subsequent communications. UE 115 may transmit a first random access message (e.g., message 1 in a four-step random access procedure or message A in a two-step random access procedure) to base station 105 on PRACH resource 4.

Upon receiving the first random access message on PRACH resource 4, base station 105 may determine that both beam 405-*a* and beam 405-*b* are candidate beams, and may select one of the two candidate beams 405 for transmitting a second random access message (e.g., random access message 2 or random access message B). Base station 105 and UE 115 may compete the random access procedure using the selected candidate beam 405 and may establish a connection based thereon.

Figure 6:
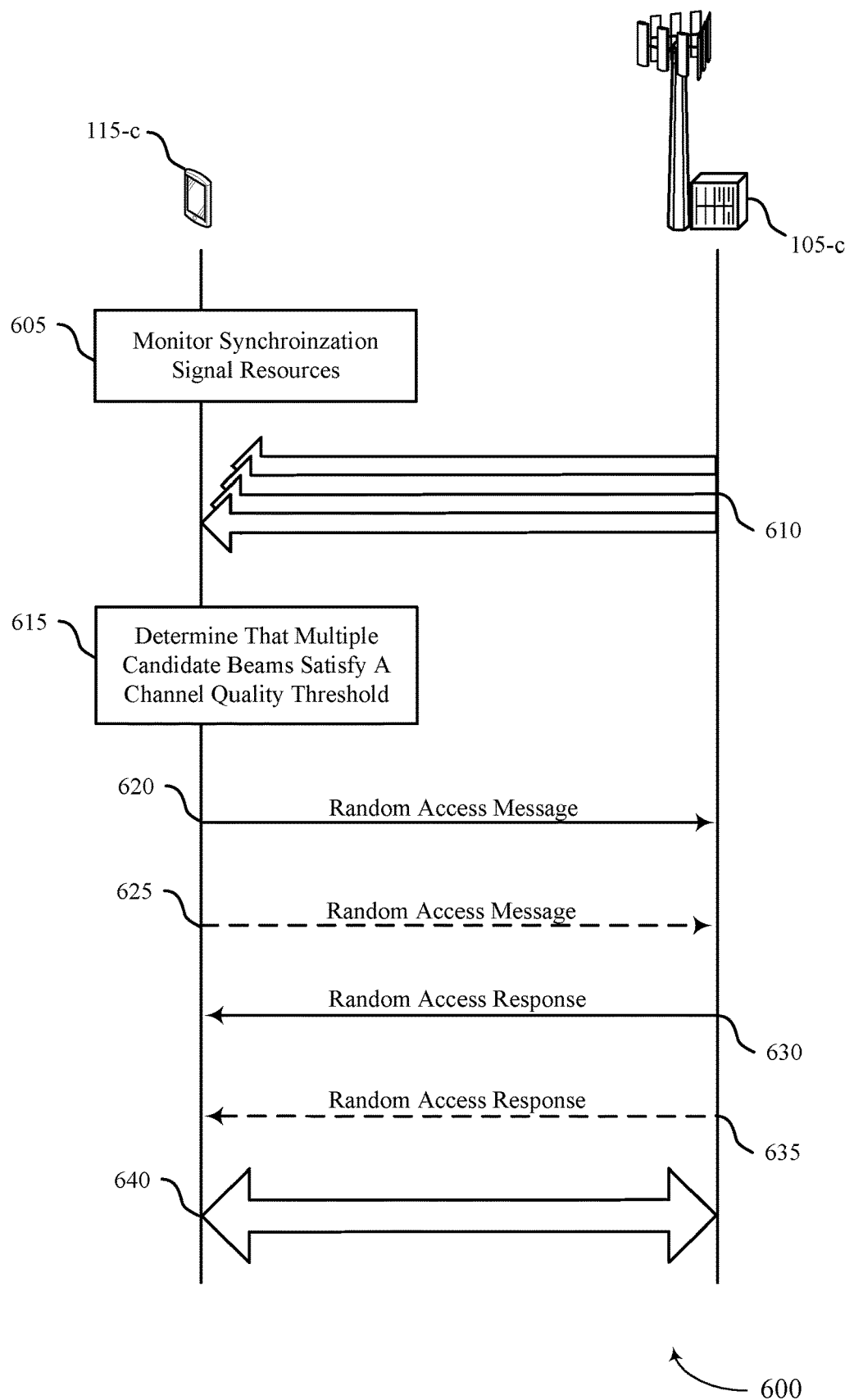
FIG. 6 illustrates an example of a process flow that supports beam indications during random access procedures in accordance with aspects of the present disclosure.

FIG. 6 illustrates an example of a process flow 600 that supports beam indications during random access procedures in accordance with aspects of the present disclosure. In some examples, process flow 600 may implement aspects of wireless communications system 100. Process flow 600 may include a UE 115-*c*, and a base station 105-*c*, which may be examples of corresponding devices described with reference to FIGS. 1 and 2.

At 605, UE 115-*c* may monitor multiple synchronization signal resources (e.g., SSB resources), each synchronization signal resource associated with a beam (e.g., a transmit beam for base station 105-*c*) of a set of beams. In some examples, base station 105-*c* may transmit a configuration message including configuration information indicating the synchronization signal resources, PRACH resources for first random access messages, or both.

At 610, base station 105-*c* may transmit one or more synchronization signals (e.g., SSBs) over the synchronization signal resources on the set of beams (e.g., one SSB for each beam of the set of beams). UE 115-*c* may receive, based on the monitoring at 605, the SSBs on the set of beams. UE 115-*c* may perform one or more channel quality measurements (e.g., RSRP measurements or RSRQ measurements), on the received SSBs.

At 615, UE 115-*c* may determine that multiple candidate beams of the set of beams satisfy a channel quality threshold. The determination may be based on the one or more channel quality measurements.

In some examples, UE 115-*c* may identify a channel quality measurement threshold. In such examples, UE 115-*c* may receive a message (e.g., a configuration message) from base station 105-*c* indicating the channel quality measurement threshold. In some examples, UE 115-*c* may perform channel quality measurements on each SSB and may compare channel quality measurement values for each SSB to the channel quality measurement threshold. UE 115-*c* may then determine that each SSB with a channel quality measurement value that satisfies the channel quality measurement threshold is a candidate SSB. Transmit beams on which the candidate SSBs were transmitted by base station 105-*c* at 1510 may be considered candidate beams.

In some examples, UE 115-*c* may identify a best or preferred SSB. The preferred SSB may have a channel quality measurement value that satisfies a channel quality measurement threshold, or may have a highest channel quality measurement value. UE 115-*c* may determine if any other SSBs are also candidate SSBs. For instance, UE 115-*c* may compare channel quality measurement values of other SSBs to the channel quality measurement value of the preferred SSB. Any SSBs having channel quality measurement values that are within a threshold difference from the channel quality measurement value of the preferred SSB may be considered candidate SSBs. Transmit beams on which the candidate SSBs were transmitted by base station 105-*c* at 610 may be considered candidate beams.

In some examples, as described with reference to FIG. 5, UE 115-*c* may transmit a single, first random access message on a PRACH resource indicating multiple candidate beams. UE 115-*c* may identify a PRACH resource that maps to each of the candidate beams identified at 615 (e.g., two candidate beams, three candidate beams, or more candidate beams). The PRACH resources may be previously configured by base station 105-*c*, preconfigured, or indicated in one or more standards. The first random access message transmitted at 620 may be a message 1 in a four-step random access procedure, or a message A in a two-step random access procedure. In such examples, at 630, base station 105-*c* may transmit a second random access message (e.g., message 2 in a four-step random access procedure or message B in a two-step random access procedure). Base station 105-*c* may select one of the candidate beams indicated by the PRACH resource on which the first random access message was received at 620 and may transmit the second random access message (e.g., a random access response) on one of the candidate beams.

In some examples, as described with reference to FIG. 4, UE 115-*c* may transmit multiple random access messages on multiple PRACH resources. For instance, UE 115-*c* may identify a first PRACH resource associated with a first candidate beam. At 620, UE 115-*c* may transmit a first random access message (e.g., a message 1 in a four-step random access procedure, or a message A in a two-step random access procedure) on the first PRACH resource. UE 115-*c* may identify a second PRACH resource associated with a second candidate beam. At 625, UE 115-*c* may transmit a second random access message (e.g., a message 1 in a four-step random access procedure, or a message A in a two-step random access procedure) on the second PRACH resource. UE 115-*c* may transmit a random access message for each candidate beam of the multiple candidate beams on PRACH resources associated with each candidate beam. For example, UE 115-*c* may transmit multiple random access message on multiple PRACH resources (e.g., two random access messages, three random access messages, four random access messages, or any number of random access messages consisted with techniques described herein). At 630, base station 105-*c* may transmit a random access response (e.g., message 2 in a four-step random access procedure or message B in a two-step random access procedure). The random access response transmitted at 630 may be responsive to the first random access message received at 620. Base station 105-*c* may transmit the first random access response on the transmit beam indicated by the PRACH resource on which the first random access message was received at 620. At 635, base station 105-*c* may transmit a second random access response (e.g., a message 2 in a four-step random access procedure or a message B in a two-step random access procedure). The second random access response may be responsive to the second random access message received at 625. Base station 105-c may transmit the second random access response on the transmit beam indicated by the PRACH resource on which the second random access message was received at 625. Additionally, base station 105-c may transmit a random response message for each indicated candidate beam of the multiple candidate beams, as indicated by PRACH resources associated with each candidate beam on which multiple random access messages were previously received. For example, base station 105-c may transmit multiple random access responses (e.g., two random access messages, three random access messages, four random access messages, or any number of random access messages consisted with techniques described herein) in response to the same number of received first random access messages. UE 115-c may decode and respond to a first received random access response. For instance, UE 115-c may receive the first random access response at 630 on a first candidate beam of the candidate beams. UE 115-c may complete a random access procedure (e.g., a four-step random access procedure), establish a communication link at 640, or both, using the first candidate beam. UE 115-c may ignore any additional random access responses transmitted by base station 105-c (e.g., at 635).

At 640, UE 115-c may establish a connection using a candidate beam of the multiple candidate beams (e.g., the candidate beam on which base station 105-c transmitted the random access response at 630).

Figure 7:
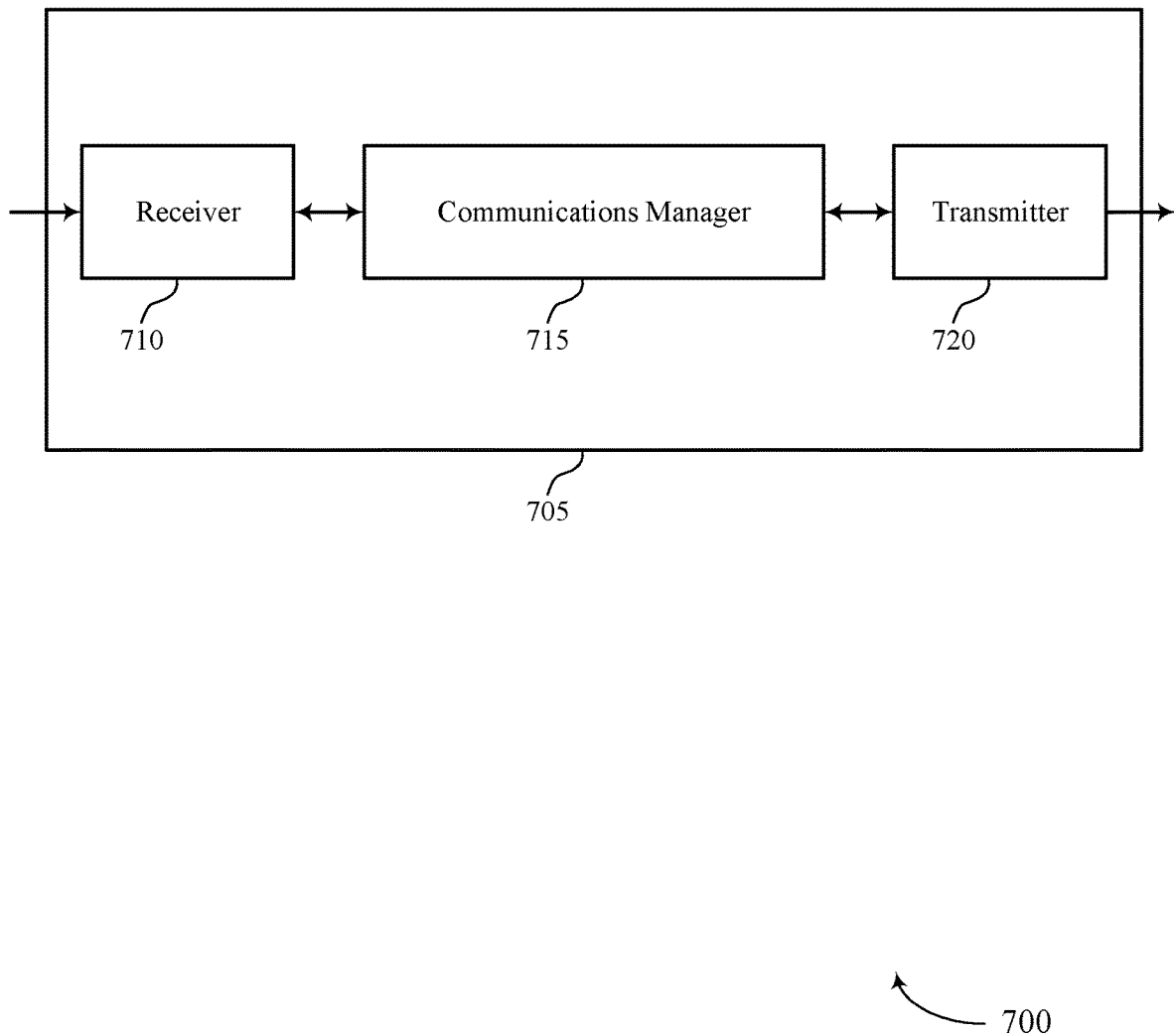
FIGS. 7 and 8 show block diagrams of devices that support beam indications during random access procedures in accordance with aspects of the present disclosure.

FIG. 7 shows a block diagram 700 of a device 705 that supports beam indications during random access procedures in accordance with aspects of the present disclosure. The device 705 may be an example of aspects of a UE 115 as described herein. The device 705 may include a receiver 710, a communications manager 715, and a transmitter 720. The device 705 may also include at least one processor. Each of these components may be in communication with one another (e.g., via one or more buses).

The receiver 710 may receive information such as packets, user data, or control information associated with various information channels (e.g., control channels, data channels, or information related to beam indications during random access procedures). Information may be passed on to other components of the device 705. The receiver 710 may be an example of aspects of the transceiver 1020 described with reference to FIG. 10. The receiver 710 may utilize a single antenna or a set of antennas.

The communications manager 715 may monitor a set of synchronization signal resources, each synchronization signal resource of the set of synchronization signal resources associated with a beam of a set of beams, determine, based on the monitoring, that multiple candidate beams of the set of beams satisfy a channel quality threshold, transmit, as part of a random access procedure with a base station, an indication that the multiple candidate beams satisfy the channel quality threshold, receive, based on transmitting the indication, an indication of a first beam of the multiple candidate beams, and establish a connection with the base station via the first beam. The communications manager 715 may be an example of aspects of the communications manager 1010 described herein.

The communications manager 715, or its sub-components, may be implemented in hardware, software (e.g., executed by at least one processor), or any combination thereof. If implemented in code executed by at least one processor, the functions of the communications manager 715, or its sub-components may be executed by at least one general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow for indicating multiple candidate beams (e.g., for completing a random access procedure), resulting in decreased system latency, increased likelihood of successfully completed random access procedures, improved battery life, or improved reliability of communications.

Figure 10:
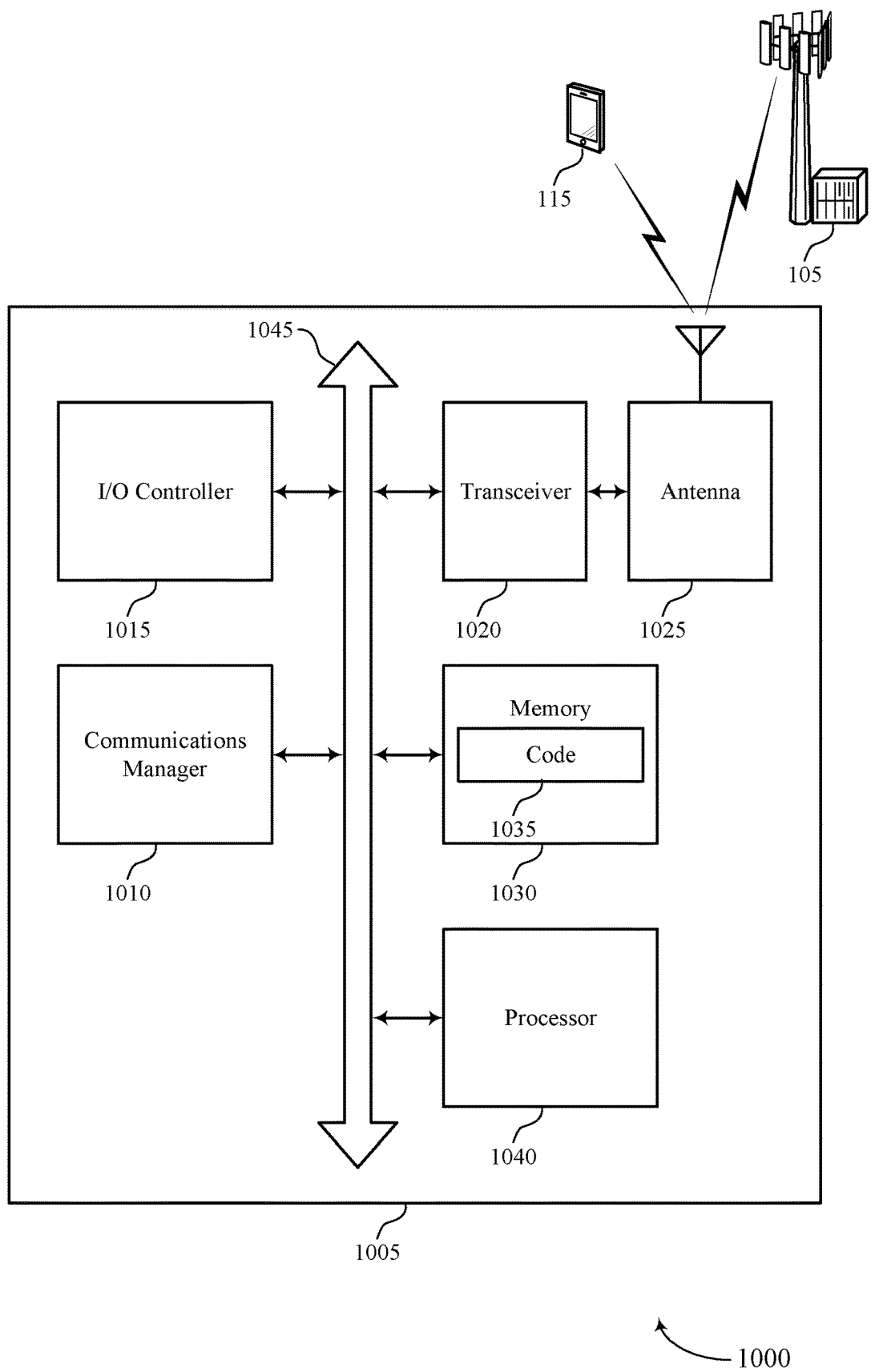
FIG. 10 shows a diagram of a system including a device that supports beam indications during random access procedures in accordance with aspects of the present disclosure.

Based on techniques for efficiently communicating maximum number of layers for a device as described herein, at least one processor of a UE 115 (e.g., controlling the receiver 710, the transmitter 720, or a transceiver 1020 as described with respect to FIG. 10) may increase system efficiency and decrease unnecessary processing at a device.

Figure 8:
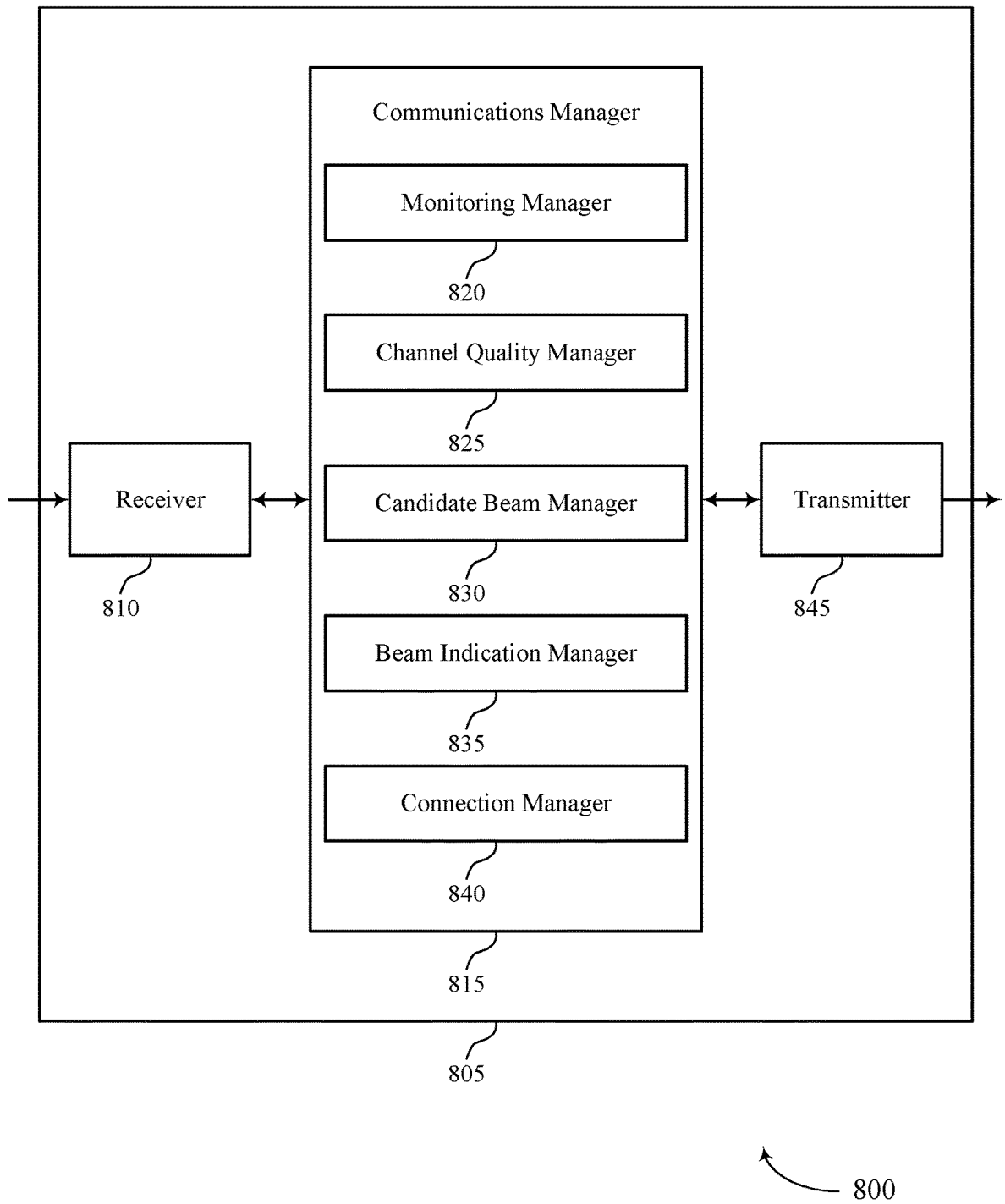

FIG. 8 shows a block diagram 800 of a device 805 that supports beam indications during random access procedures in accordance with aspects of the present disclosure. The device 805 may be an example of aspects of a device 705, or a UE 115 as described herein. The device 805 may include a receiver 810, a communications manager 815, and a transmitter 845. The device 805 may also include at least one processor. Each of these components may be in communication with one another (e.g., via one or more buses).

The receiver 810 may receive information such as packets, user data, or control information associated with various information channels (e.g., control channels, data channels, or information related to beam indications during random access procedures). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a monitoring manager 820, a channel quality manager 825, a candidate beam manager 830, a beam indication manager 835, and a connection manager 840. The communications manager 815 may be an example of aspects of the communications manager 1010 described herein.

The monitoring manager 820 may monitor a set of synchronization signal resources, each synchronization signal resource of the set of synchronization signal resources associated with a beam of a set of beams.

The channel quality manager 825 may determine, based on the monitoring, that multiple candidate beams of the set of beams satisfy a channel quality threshold.

The candidate beam manager 830 may transmit, as part of a random access procedure with a base station, an indication that the multiple candidate beams satisfy the channel quality threshold.

The beam indication manager 835 may receive, based on transmitting the indication, an indication of a first beam of the multiple candidate beams.

The connection manager 840 may establish a connection with the base station via the first beam.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
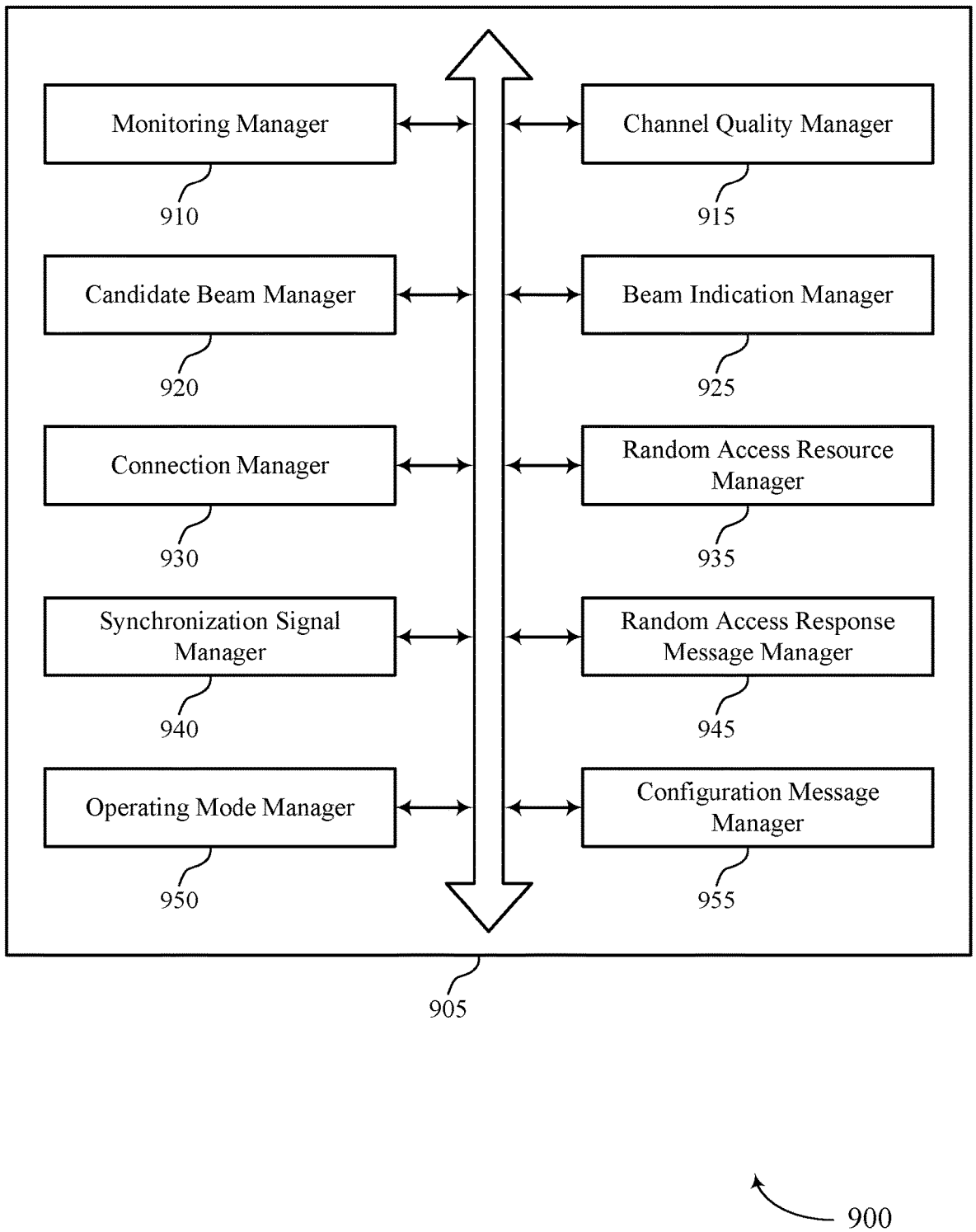
FIG. 9 shows a block diagram of a communications manager that supports beam indications during random access procedures in accordance with aspects of the present disclosure.

FIG. 9 shows a block diagram 900 of a communications manager 905 that supports beam indications during random access procedures in accordance with aspects of the present disclosure. The communications manager 905 may be an example of aspects of a communications manager 715, a communications manager 815, or a communications manager 1010 described herein. The communications manager 905 may include a monitoring manager 910, a channel quality manager 915, a candidate beam manager 920, a beam indication manager 925, a connection manager 930, a random access resource manager 935, a synchronization signal manager 940, a random access response message manager 945, an operating mode manager 950, and a configuration message manager 955. Each of these modules may communicate, directly or indirectly, with one another (e.g., via one or more buses).

The monitoring manager 910 may monitor a set of synchronization signal resources, each synchronization signal resource of the set of synchronization signal resources associated with a beam of a set of beams.

The channel quality manager 915 may determine, based on the monitoring, that multiple candidate beams of the set of beams satisfy a channel quality threshold. In some examples, the channel quality manager 915 may perform one or more channel quality measurements on the one or more synchronization signals, where determining that the multiple candidate beams of the set of beams satisfy the channel quality threshold is based on performing the one or more channel quality measurements. In some examples, the channel quality manager 915 may identify, based on performing the one or more channel quality measurements, a first channel quality measurement value for the first beam of the multiple candidate beams.

In some examples, the channel quality manager 915 may identify, based on performing the one or more channel quality measurements, a second channel quality measurement value for the second beam of the multiple candidate beams, where the second channel quality measurement value is less than the first channel quality measurement. In some examples, the channel quality manager 915 may determine that a difference between the first channel quality measurement value and the second channel quality measurement value satisfies a channel quality difference threshold, where determining that the multiple candidate beams of the set of beams satisfy the channel quality threshold is based on determining that the difference between the first channel quality measurement value and the second channel quality measurement value satisfies the channel quality difference threshold.

In some examples, the channel quality manager 915 may identify, based on performing the one or more channel quality measurement, a third channel quality measurement value for a third beam of the set of beams. In some examples, the channel quality manager 915 may determine that a difference between the first channel quality measurement value and the third channel quality measurement value does not satisfy the channel quality difference threshold. In some examples, the channel quality manager 915 may determine, based on determining that the third channel quality measurement value does not satisfy the channel quality difference threshold, that the third beam of the set of beams is not one of the multiple candidate beams of the set of beams that satisfy the signal quality threshold measurement value. In some cases, the one or more channel quality measurements include reference signal received power (RSRP) measurements, reference signal received quality (RSRQ) measurements, or a combination thereof.

The candidate beam manager 920 may transmit, as part of a random access procedure with a base station, an indication that the multiple candidate beams satisfy the channel quality threshold.

The beam indication manager 925 may receive, based on transmitting the indication, an indication of a first beam of the multiple candidate beams.

The connection manager 930 may establish a connection with the base station via the first beam.

The random access resource manager 935 may identify a random access resource associated with the multiple candidate beams of the set of beams. In some examples, the random access resource manager 935 may transmit, as part of the random access procedure with the base station, a first random access message on the identified random access resource. In some examples, the random access resource manager 935 may identify a first random access resource associated with the first beam of the multiple candidate beams. In some examples, the random access resource manager 935 may transmit a first random access message on the identified first random access resource.

In some examples, the random access resource manager 935 may identify a second random access resource associated with a second beam of the multiple candidate beams. In some examples, the random access resource manager 935 may transmit a second random access message on the identified second random access resource.

The synchronization signal manager 940 may receive, based on the monitoring, one or more synchronization signals over the set of synchronization signal resources.

The random access response message manager 945 may receive, using the first beam, a first random access response message associated with the first random access message. In some examples, the random access response message manager 945 may ignore, based on receiving the first random access response message, a second random access response message associated with the second random access message. In some examples, the random access response message manager 945 may receive, as part of the random access procedure with the base station, a random access response message using the first beam.

The operating mode manager 950 may determine that the UE is operating in a time-division duplex mode, where transmitting the first random access message on the identified first random access resource and transmitting the second random access message on the identified second random access resource is based on determining that the UE is operating in the time-division duplex mode. The configuration message manager 955 may receive, from the base station, a configuration message indicating one or more random access resources on which to transmit the indication that the multiple candidate beams satisfy the channel quality threshold.

FIG. 10 shows a diagram of a system 1000 including a device 1005 that supports beam indications during random access procedures in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may monitor a set of synchronization signal resources, each synchronization signal resource of the set of synchronization signal resources associated with a beam of a set of beams, determine, based on the monitoring, that multiple candidate beams of the set of beams satisfy a channel quality threshold, transmit, as part of a random access procedure with a base station, an indication that the multiple candidate beams satisfy the channel quality threshold, receive, based on transmitting the indication, an indication of a first beam of the multiple candidate beams, and establish a connection with the base station via the first beam.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of at least one processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the at least one processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam indications during random access procedures).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
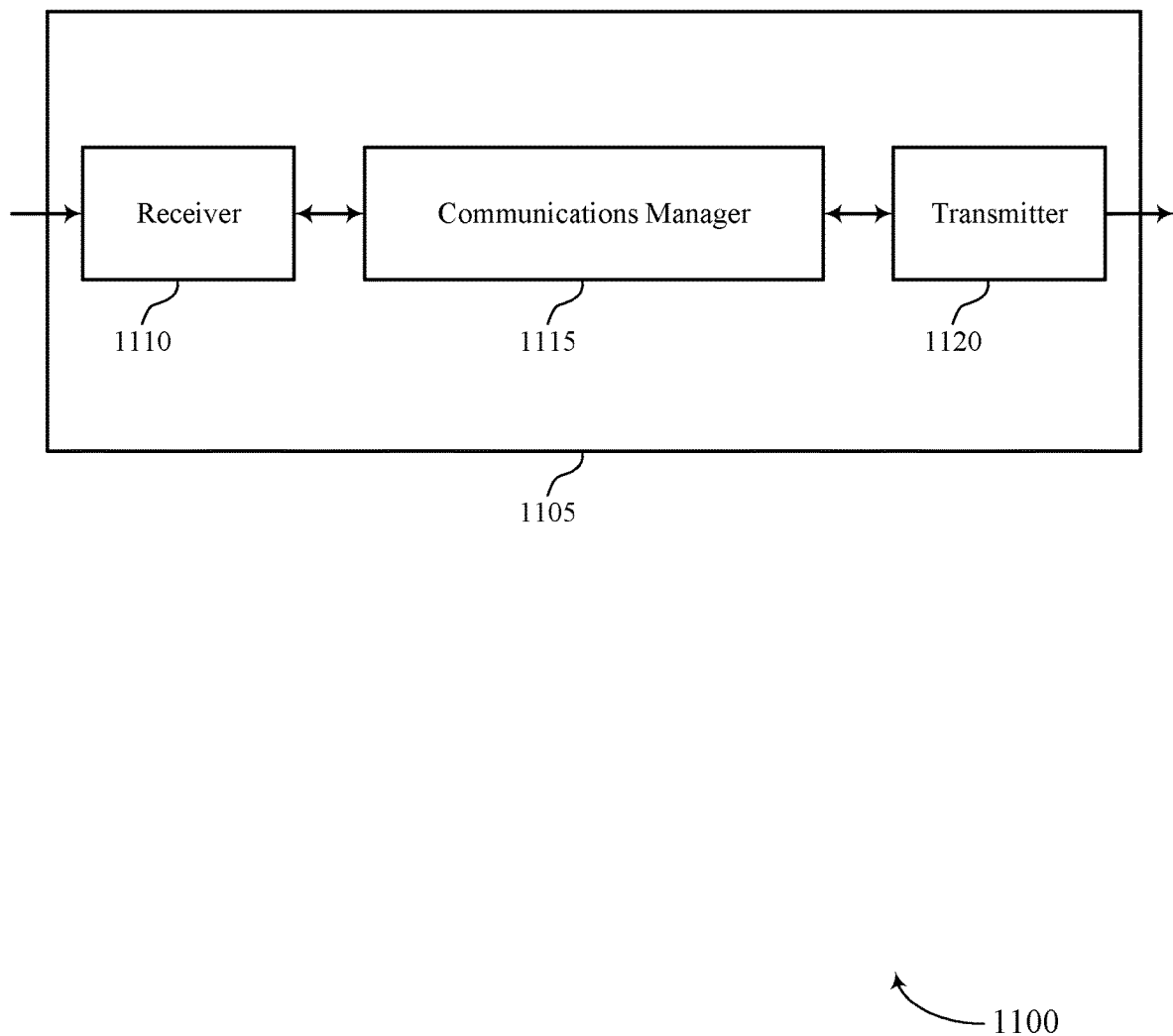
FIGS. 11 and 12 show block diagrams of devices that support beam indications during random access procedures in accordance with aspects of the present disclosure.

FIG. 11 shows a block diagram 1100 of a device 1105 that supports beam indications during random access procedures in accordance with aspects of the present disclosure. The device 1105 may be an example of aspects of a base station 105 as described herein. The device 1105 may include a receiver 1110, a communications manager 1115, and a transmitter 1120. The device 1105 may also include at least one processor. Each of these components may be in communication with one another (e.g., via one or more buses).

The receiver 1110 may receive information such as packets, user data, or control information associated with various information channels (e.g., control channels, data channels, or information related to beam indications during random access procedures). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit one or more synchronization signals over a set of synchronization signal resources, each synchronization signal resource of the set of synchronization signal resources associated with a transmit beam of a set of transmit beams, receive, as part of a random access procedure with a UE, an indication that multiple candidate beams of the set of transmit beams satisfy a channel quality threshold, transmit, based at least in part on receiving the indication, an indication of a first beam of the multiple candidate beams, and establish a connection with the UE via the first beam. The communications manager 1115 may be an example of aspects of the communications manager 1410 described herein.

The communications manager 1115 or its sub-components, may be implemented in hardware, software (e.g., executed by at least one processor), or any combination thereof. If implemented in code executed by at least one processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
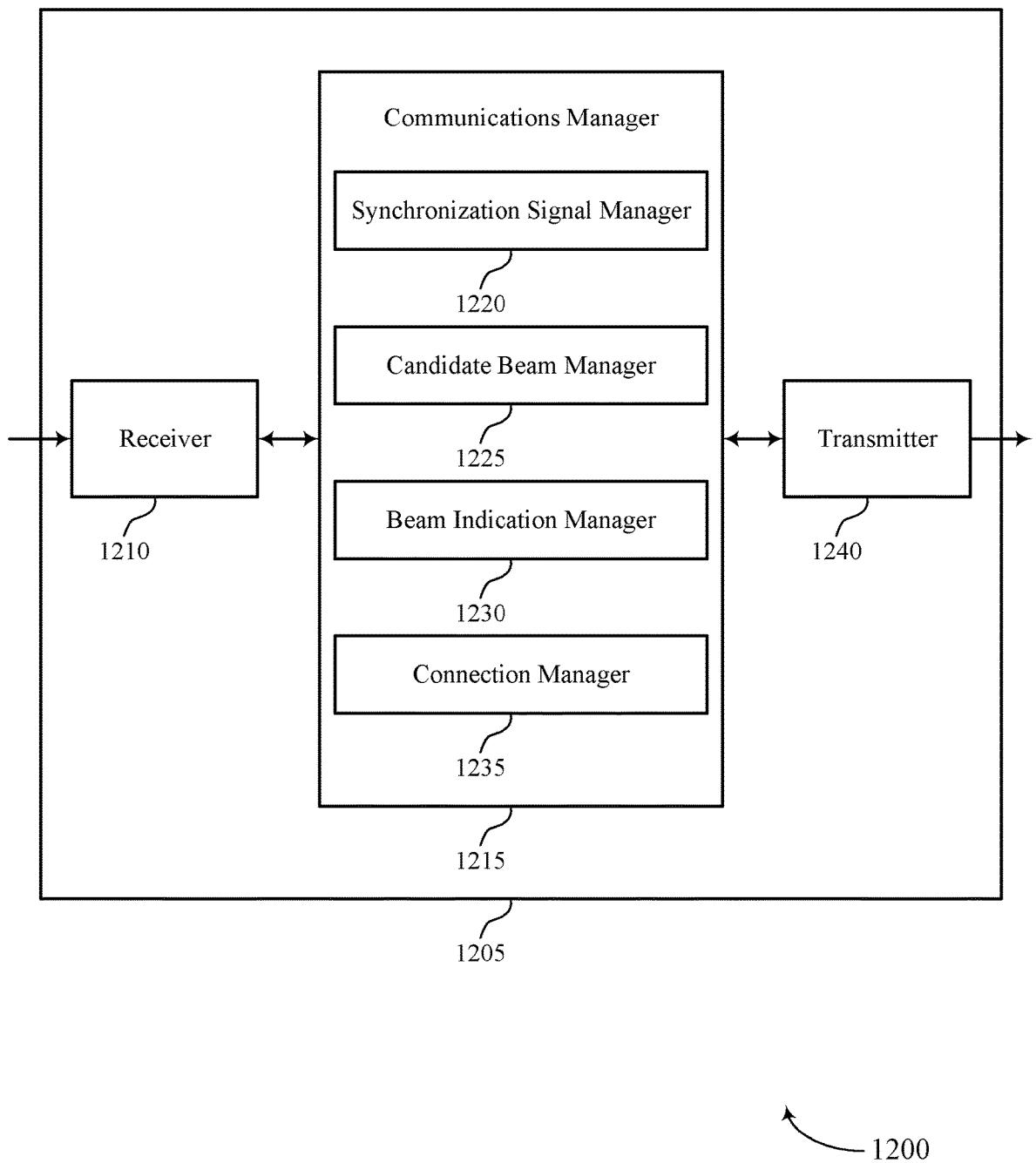

FIG. 12 shows a block diagram 1200 of a device 1205 that supports beam indications during random access procedures in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include at least one processor. Each of these components may be in communication with one another (e.g., via one or more buses).

The receiver 1210 may receive information such as packets, user data, or control information associated with various information channels (e.g., control channels, data channels, or information related to beam indications during random access procedures). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a synchronization signal manager 1220, a candidate beam manager 1225, a beam indication manager 1230, and a connection manager 1235. The communications manager 1215 may be an example of aspects of the communications manager 1410 described herein.

The synchronization signal manager 1220 may transmit one or more synchronization signals over a set of synchronization signal resources, each synchronization signal resource of the set of synchronization signal resources associated with a transmit beam of a set of transmit beams.

The candidate beam manager 1225 may receive, as part of a random access procedure with a UE, an indication that multiple candidate beams of the set of transmit beams satisfy a channel quality threshold.

The beam indication manager 1230 may transmit, based at least in part on receiving the indication, an indication of a first beam of the multiple candidate beams.

The connection manager 1235 may establish a connection with the UE via the first beam.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
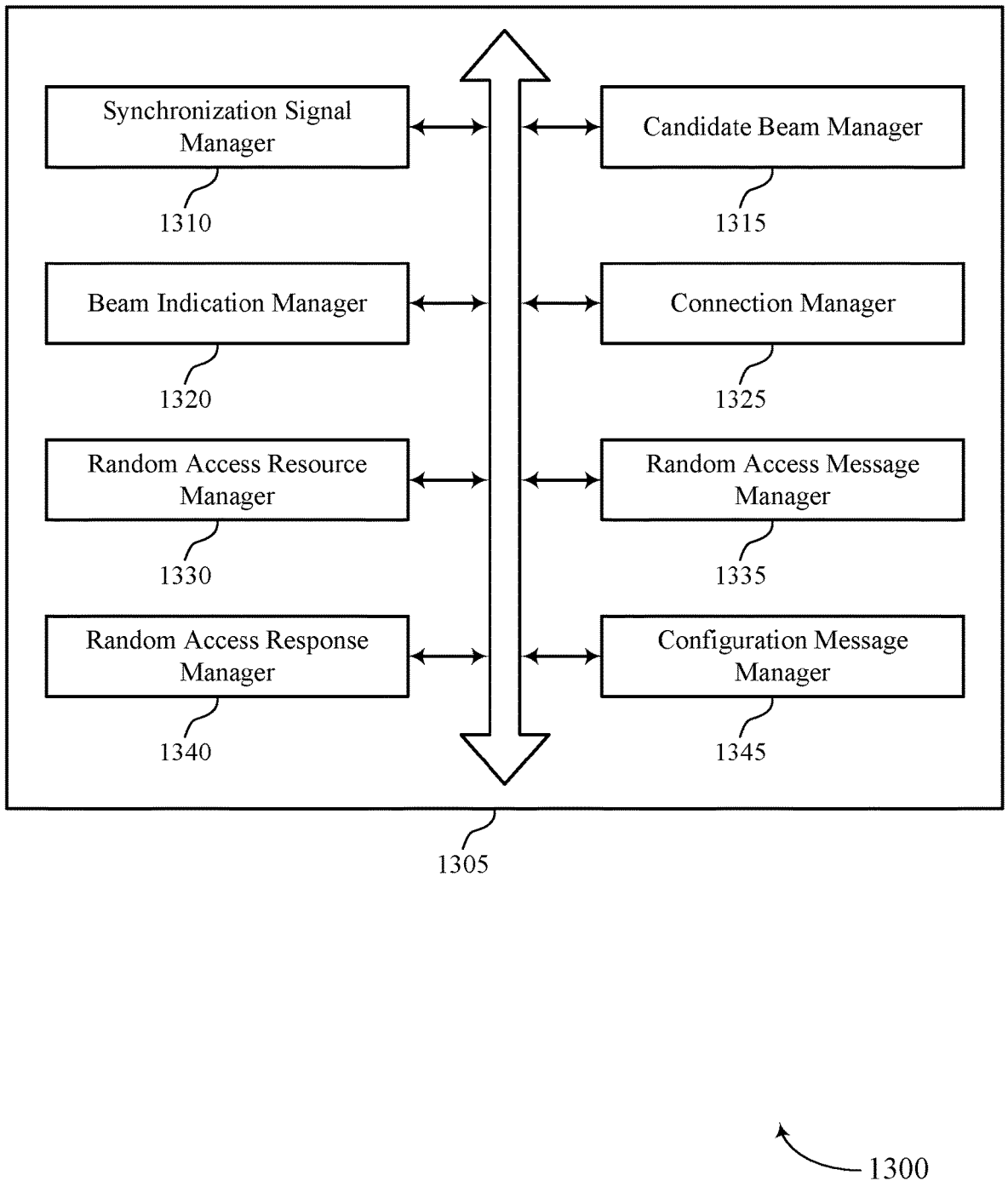
FIG. 13 shows a block diagram of a communications manager that supports beam indications during random access procedures in accordance with aspects of the present disclosure.

FIG. 13 shows a block diagram 1300 of a communications manager 1305 that supports beam indications during random access procedures in accordance with aspects of the present disclosure. The communications manager 1305 may be an example of aspects of a communications manager 1115, a communications manager 1215, or a communications manager 1410 described herein. The communications manager 1305 may include a synchronization signal manager 1310, a candidate beam manager 1315, a beam indication manager 1320, a connection manager 1325, a random access resource manager 1330, a random access message manager 1335, a random access response manager 1340, and a configuration message manager 1345. Each of these modules may communicate, directly or indirectly, with one another (e.g., via one or more buses).

The synchronization signal manager 1310 may transmit one or more synchronization signals over a set of synchronization signal resources, each synchronization signal resource of the set of synchronization signal resources associated with a transmit beam of a set of transmit beams.

The candidate beam manager 1315 may receive, as part of a random access procedure with a UE, an indication that multiple candidate beams of the set of transmit beams satisfy a channel quality threshold.

The beam indication manager 1320 may transmit, based at least in part on receiving the indication, an indication of a first beam of the multiple candidate beams.

The connection manager 1325 may establish a connection with the UE via the first beam.

The random access resource manager 1330 may identify a random access resource associated with the multiple candidate beams of the set of beams. In some examples, the random access resource manager 1330 may receive, as part of the random access procedure with the UE, a first random access message on the identified random access resource.

The random access message manager 1335 may receive a first random access message on the first beam of the multiple candidate beams. In some examples, the random access message manager 1335 may receive a second random access message on a second beam of the multiple candidate beams.

The random access response manager 1340 may transmit, as part of the random access procedure, a random access response message using the first beam.

The configuration message manager 1345 may transmit, to the UE, a configuration message indicating one or more random access resources on which to receive the indication that the multiple candidate beams satisfy the channel quality threshold.

Figure 14:
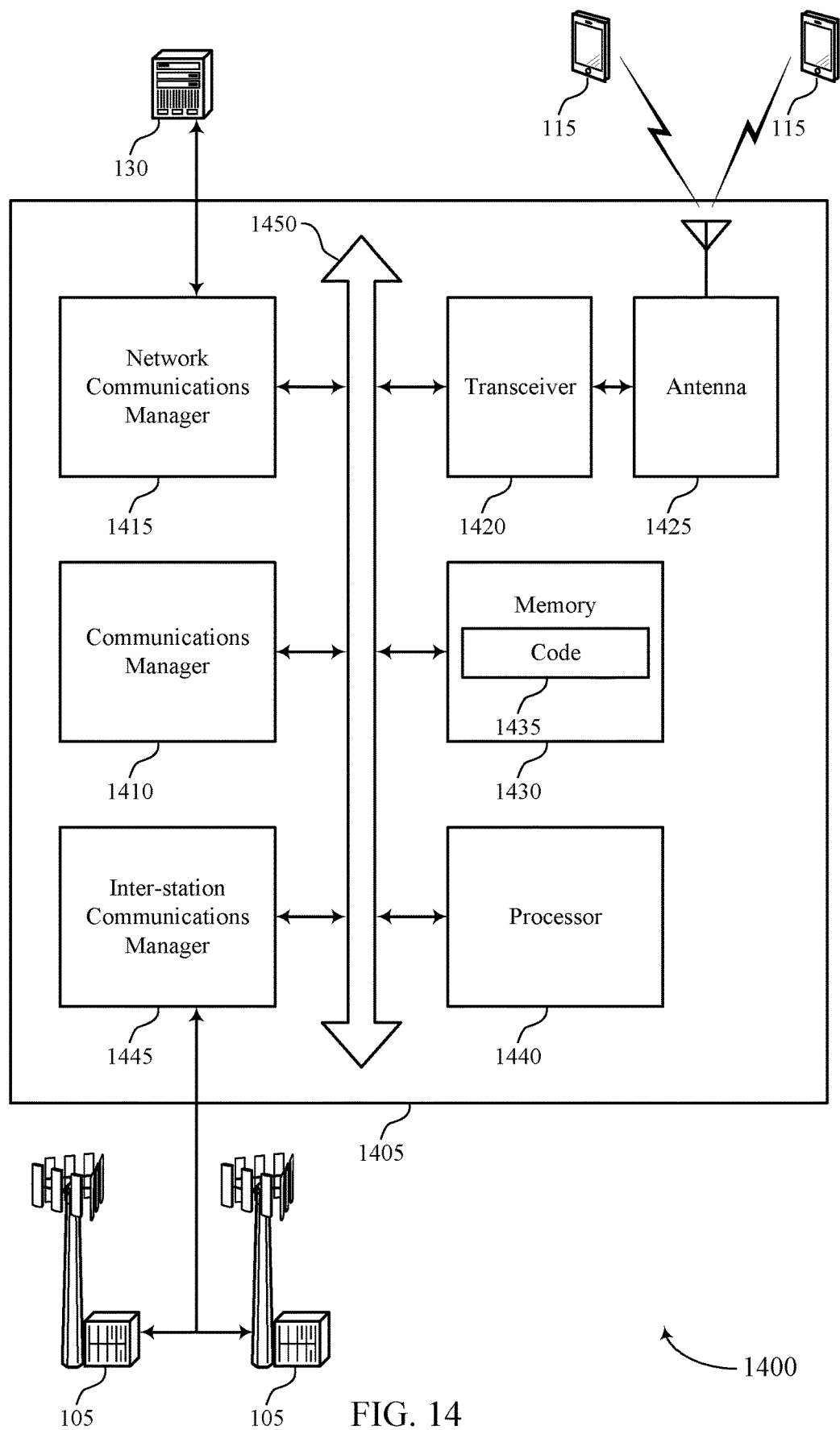
FIG. 14 shows a diagram of a system including a device that supports beam indications during random access procedures in accordance with aspects of the present disclosure.

FIG. 14 shows a diagram of a system 1400 including a device 1405 that supports beam indications during random access procedures in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit one or more synchronization signals over a set of synchronization signal resources, each synchronization signal resource of the set of synchronization signal resources associated with a transmit beam of a set of transmit beams, receive, as part of a random access procedure with a UE, an indication that multiple candidate beams of the set of transmit beams satisfy a channel quality threshold, transmit, based at least in part on receiving the indication, an indication of a first beam of the multiple candidate beams, and establish a connection with the UE via the first beam.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by at least one processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam indications during random access procedures).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
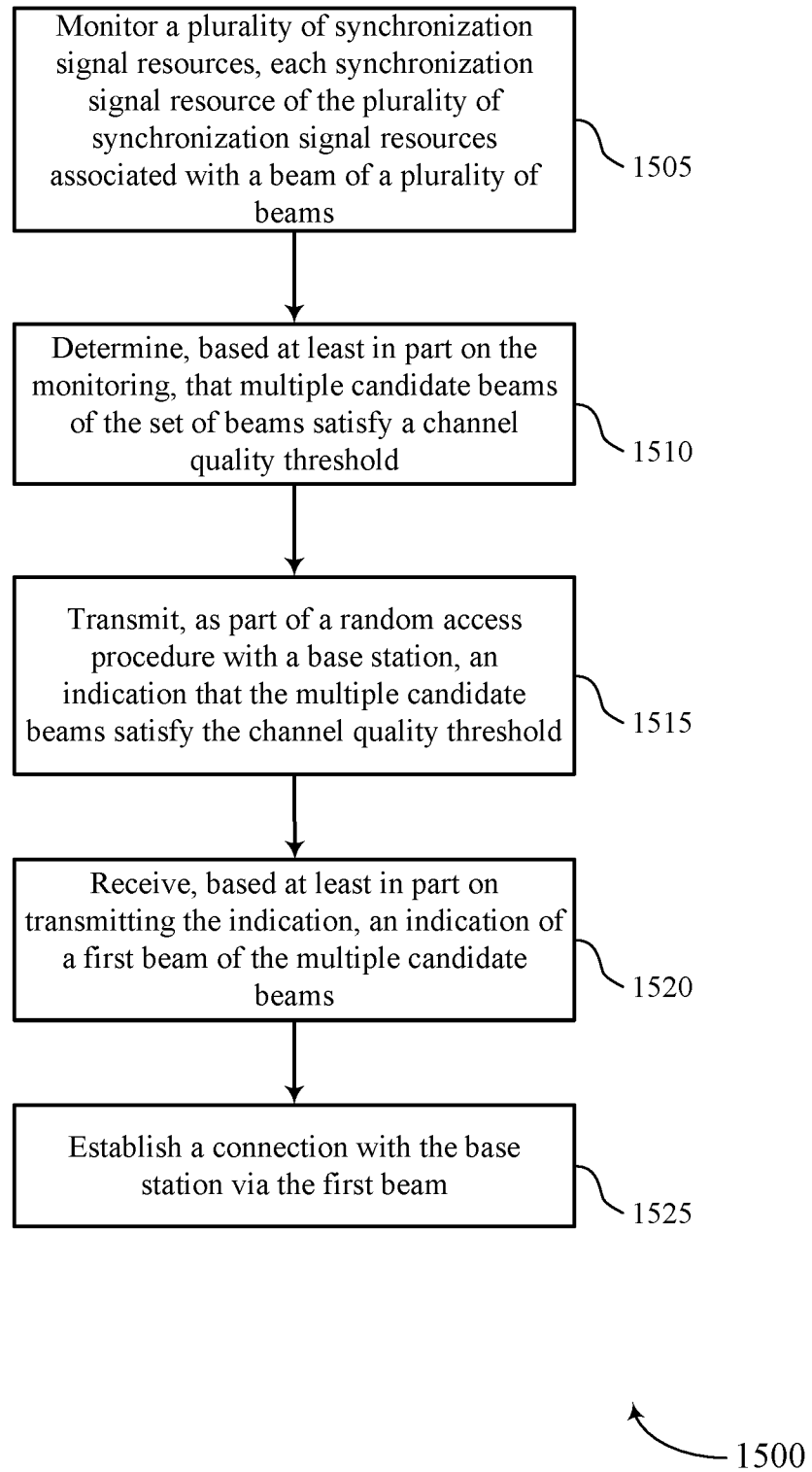
FIGS. 15 through 18 show flowcharts illustrating methods that support beam indications during random access procedures in accordance with aspects of the present disclosure.

FIG. 15 shows a flowchart illustrating a method 1500 that supports beam indications during random access procedures in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1505, the UE may monitor a plurality of synchronization signal resources, each synchronization signal resource of the plurality of synchronization signal resources associated with a beam of a set of beams. The operations of 1505 may be performed according to the methods described herein. In some examples, aspects of the operations of 1505 may be performed by a monitoring manager as described with reference to FIGS. 7 through 10.

At 1510, the UE may determine, based at least in part on the monitoring, that multiple candidate beams of the set of beams satisfy a channel quality threshold. The operations of 1510 may be performed according to the methods described herein. In some examples, aspects of the operations of 1510 may be performed by a channel quality manager as described with reference to FIGS. 7 through 10.

At 1515, the UE may transmit, as part of a random access procedure with a base station, an indication that the multiple candidate beams satisfy the channel quality threshold. The operations of 1515 may be performed according to the methods described herein. In some examples, aspects of the operations of 1515 may be performed by a candidate beam manager as described with reference to FIGS. 7 through 10.

At 1520, the UE may receive, based at least in part on transmitting the indication, an indication of a first beam of the multiple candidate beams. The operations of 1520 may be performed according to the methods described herein. In some examples, aspects of the operations of 1520 may be performed by a beam indication manager as described with reference to FIGS. 7 through 10.

At 1525, the UE may establish a connection with the base station via the first beam. The operations of 1525 may be performed according to the methods described herein. In some examples, aspects of the operations of 1525 may be performed by a connection manager as described with reference to FIGS. 7 through 10.

Figure 16:
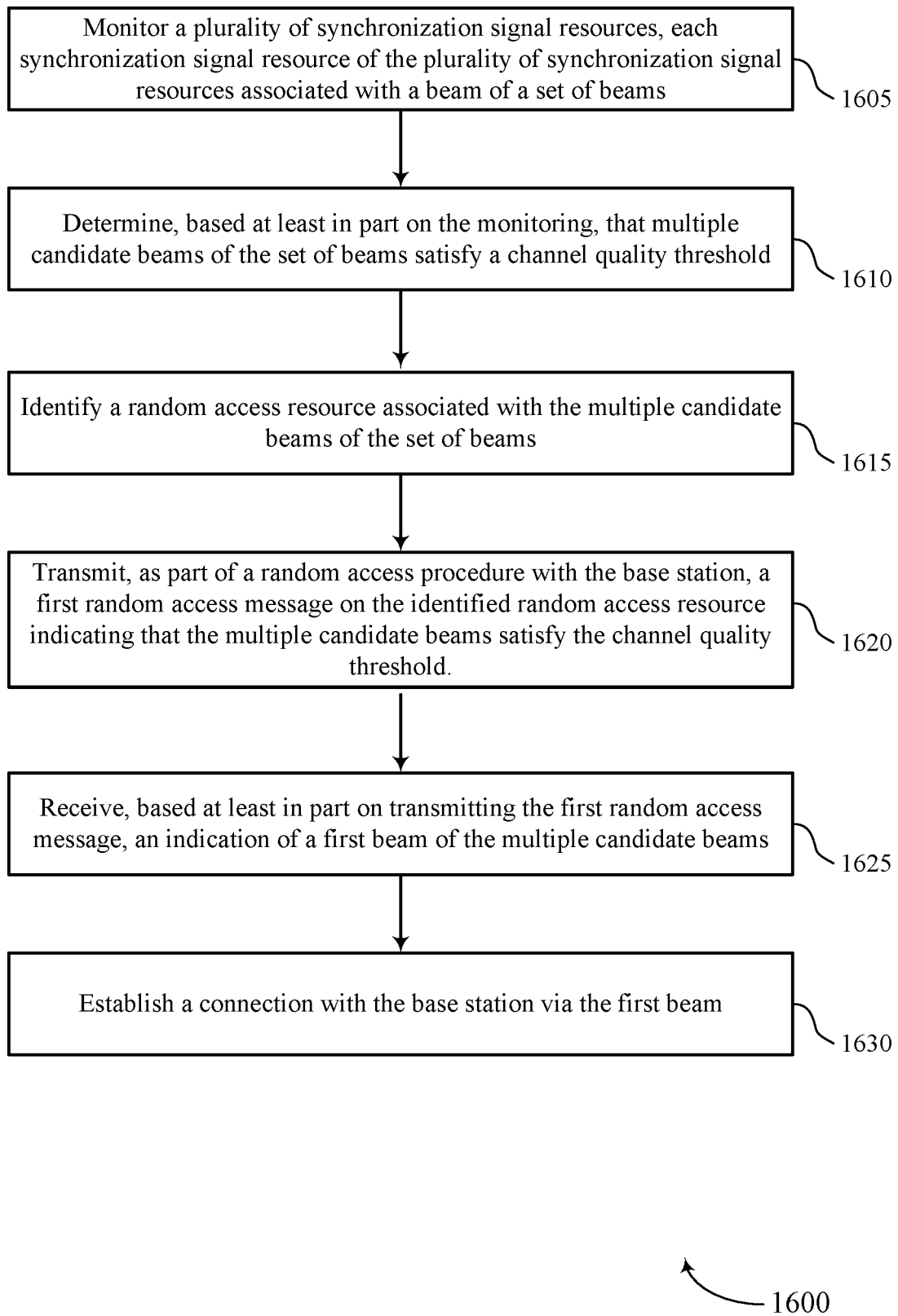

FIG. 16 shows a flowchart illustrating a method 1600 that supports beam indications during random access procedures in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1605, the UE may monitor a plurality of synchronization signal resources, each synchronization signal resource of the plurality of synchronization signal resources associated with a beam of a set of beams. The operations of 1605 may be performed according to the methods described herein. In some examples, aspects of the operations of 1605 may be performed by a monitoring manager as described with reference to FIGS. 7 through 10.

At 1610, the UE may determine, based at least in part on the monitoring, that multiple candidate beams of the set of beams satisfy a channel quality threshold. The operations of 1610 may be performed according to the methods described herein. In some examples, aspects of the operations of 1610 may be performed by a channel quality manager as described with reference to FIGS. 7 through 10.

At 1615, the UE may identify a random access resource associated with the multiple candidate beams of the set of beams. The operations of 1615 may be performed according to the methods described herein. In some examples, aspects of the operations of 1615 may be performed by a random access resource manager as described with reference to FIGS. 7 through 10.

At 1620, the UE may transmit, as part of a random access procedure with the base station, a first random access message on the identified random access resource indicating that the multiple candidate beams satisfy the channel quality threshold. The operations of 1620 may be performed according to the methods described herein. In some examples, aspects of the operations of 1620 may be performed by a random access resource manager as described with reference to FIGS. 7 through 10.

At 1625, the UE may receive, based at least in part on transmitting the first random access message, an indication of a first beam of the multiple candidate beams. The operations of 1625 may be performed according to the methods described herein. In some examples, aspects of the operations of 1625 may be performed by a beam indication manager as described with reference to FIGS. 7 through 10.

At 1630, the UE may establish a connection with the base station via the first beam. The operations of 1630 may be performed according to the methods described herein. In some examples, aspects of the operations of 1630 may be performed by a connection manager as described with reference to FIGS. 7 through 10.

Figure 17:
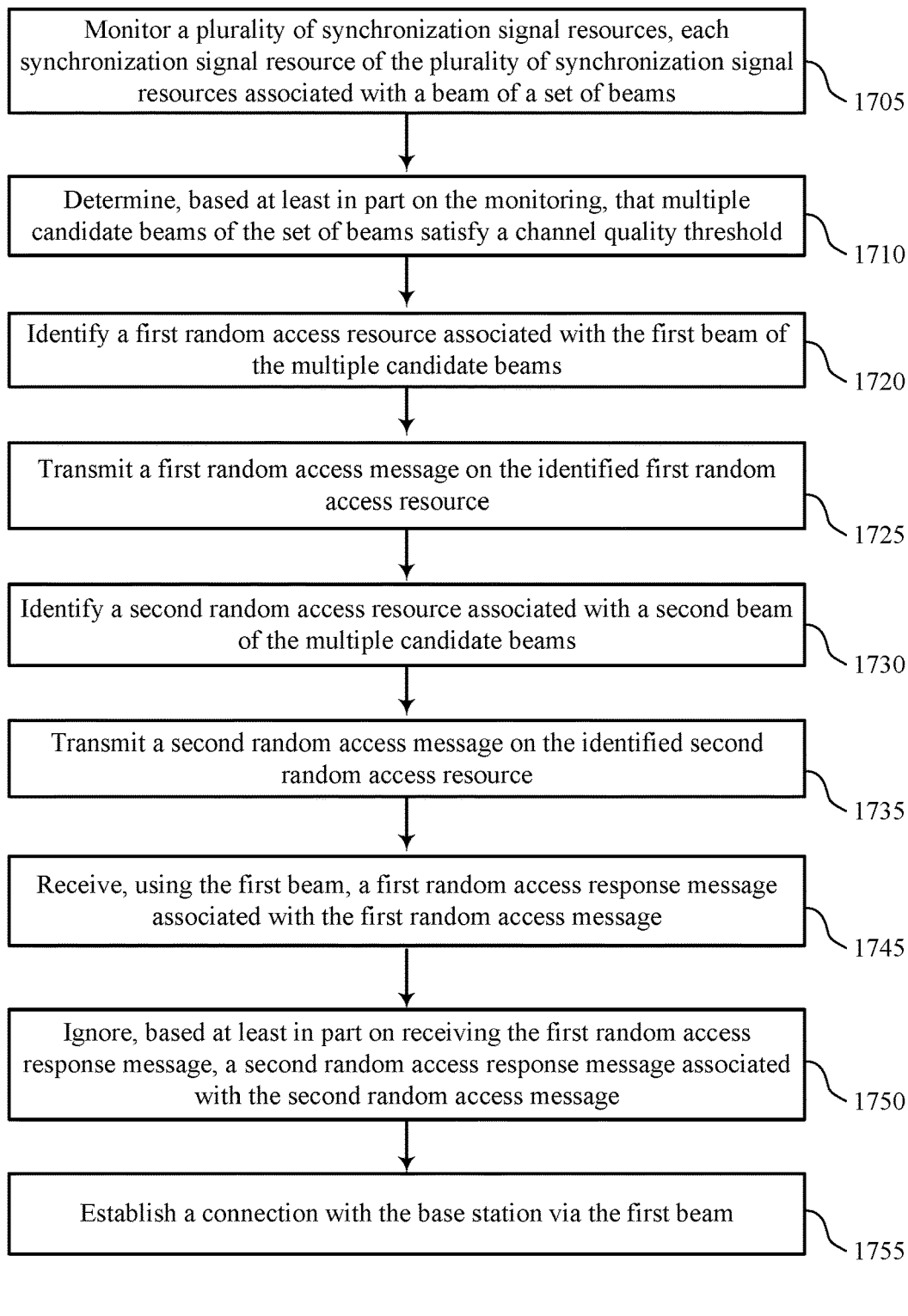

FIG. 17 shows a flowchart illustrating a method 1700 that supports beam indications during random access procedures in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1705, the UE may monitor a plurality of synchronization signal resources, each synchronization signal resource of the plurality of synchronization signal resources associated with a beam of a set of beams. The operations of 1705 may be performed according to the methods described herein. In some examples, aspects of the operations of 1705 may be performed by a monitoring manager as described with reference to FIGS. 7 through 10.

At 1710, the UE may determine, based at least in part on the monitoring, that multiple candidate beams of the set of beams satisfy a channel quality threshold. The operations of 1710 may be performed according to the methods described herein. In some examples, aspects of the operations of 1710 may be performed by a channel quality manager as described with reference to FIGS. 7 through 10.

At 1715, the UE may transmit, as part of a random access procedure with a base station, an indication that the multiple candidate beams satisfy the channel quality threshold. The operations of 1715 may be performed according to the methods described herein. In some examples, aspects of the operations of 1715 may be performed by a candidate beam manager as described with reference to FIGS. 7 through 10.

At 1720, the UE may identify a first random access resource associated with the first beam of the multiple candidate beams. The operations of 1720 may be performed according to the methods described herein. In some examples, aspects of the operations of 1720 may be performed by a random access resource manager as described with reference to FIGS. 7 through 10.

At 1725, the UE may transmit a first random access message on the identified first random access resource. The operations of 1725 may be performed according to the methods described herein. In some examples, aspects of the operations of 1725 may be performed by a random access resource manager as described with reference to FIGS. 7 through 10.

At 1730, the UE may identify a second random access resource associated with a second beam of the multiple candidate beams. The operations of 1730 may be performed according to the methods described herein. In some examples, aspects of the operations of 1730 may be performed by a random access resource manager as described with reference to FIGS. 7 through 10.

At 1735, the UE may transmit a second random access message on the identified second random access resource. The operations of 1735 may be performed according to the methods described herein. In some examples, aspects of the operations of 1735 may be performed by a random access resource manager as described with reference to FIGS. 7 through 10.

At 1740, the UE may receive, based on transmitting the indication, an indication of a first beam of the multiple candidate beams. The operations of 1740 may be performed according to the methods described herein. In some examples, aspects of the operations of 1740 may be performed by a beam indication manager as described with reference to FIGS. 7 through 10.

At 1745, the UE may receive, using the first beam, a first random access response message associated with the first random access message. The operations of 1745 may be performed according to the methods described herein. In some examples, aspects of the operations of 1745 may be performed by a random access response message manager as described with reference to FIGS. 7 through 10.

At 1750, the UE may ignore, based at least in part on receiving the first random access response message, a second random access response message associated with the second random access message. The operations of 1750 may be performed according to the methods described herein. In some examples, aspects of the operations of 1750 may be performed by a random access response message manager as described with reference to FIGS. 7 through 10.

At 1755, the UE may establish a connection with the base station via the first beam. The operations of 1755 may be performed according to the methods described herein. In some examples, aspects of the operations of 1755 may be performed by a connection manager as described with reference to FIGS. 7 through 10.

Figure 18:
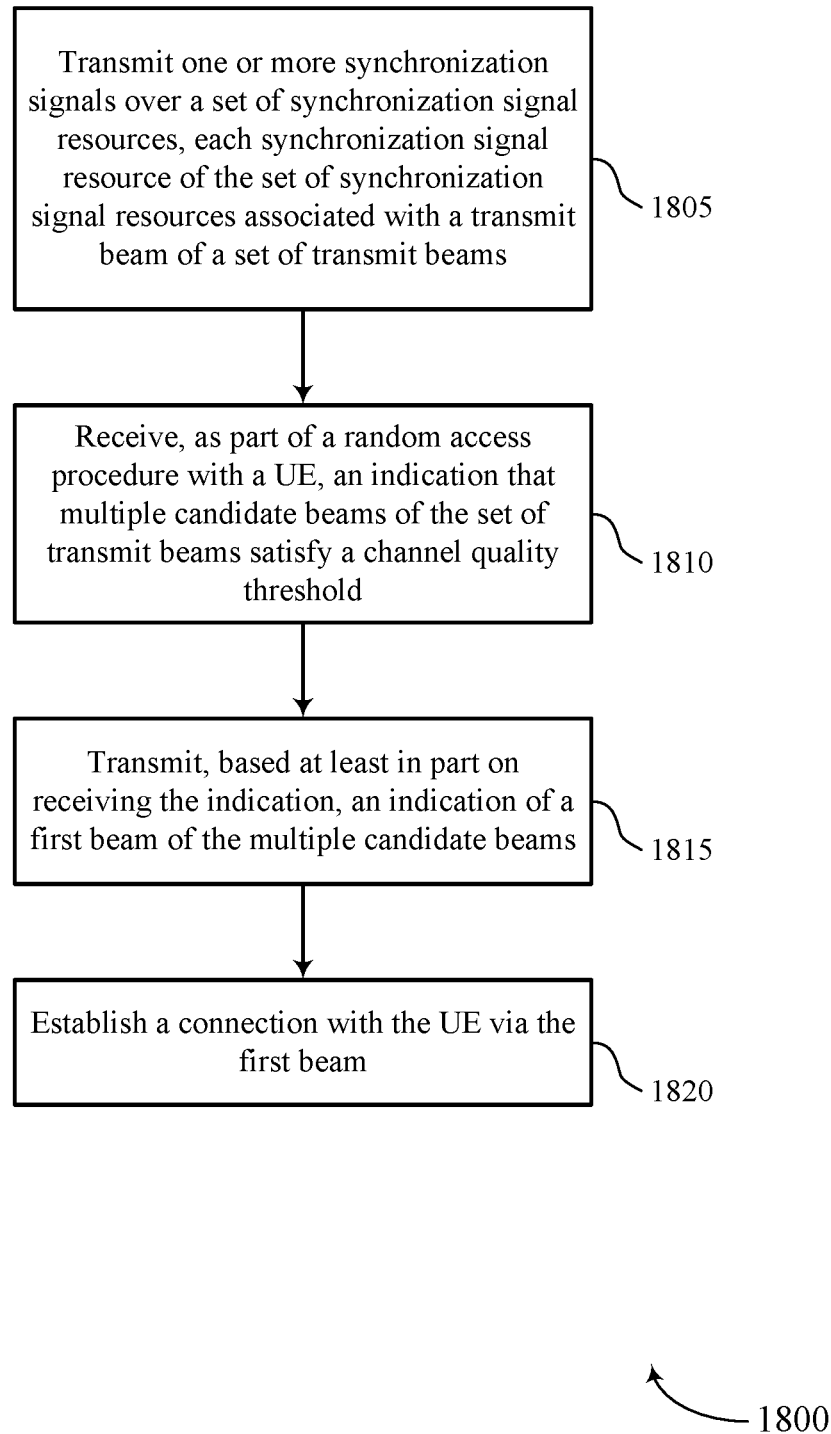

FIG. 18 shows a flowchart illustrating a method 1800 that supports beam indications during random access procedures in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally, or alternatively, a base station may perform aspects of the functions described herein using special-purpose hardware.

At 1805, the base station may transmit one or more synchronization signals over a set of synchronization signal resources, each synchronization signal resource of the set of synchronization signal resources associated with a transmit beam of a set of transmit beams. The operations of 1805 may be performed according to the methods described herein. In some examples, aspects of the operations of 1805 may be performed by a synchronization signal manager as described with reference to FIGS. 11 through 14.

At 1810, the base station may receive, as part of a random access procedure with a UE, an indication that multiple candidate beams of the set of transmit beams satisfy a channel quality threshold. The operations of 1810 may be performed according to the methods described herein. In some examples, aspects of the operations of 1810 may be performed by a candidate beam manager as described with reference to FIGS. 11 through 14.

At 1815, the base station may transmit, based at least in part on receiving the indication, an indication of a first beam of the multiple candidate beams. The operations of 1815 may be performed according to the methods described herein. In some examples, aspects of the operations of 1815 may be performed by a beam indication manager as described with reference to FIGS. 11 through 14.

At 1820, the base station may establish a connection with the UE via the first beam. The operations of 1820 may be performed according to the methods described herein. In some examples, aspects of the operations of 1820 may be performed by a connection manager as described with reference to FIGS. 11 through 14.

The following provides an overview of aspects of the present disclosure:

Aspect 1: A method for wireless communications at a UE, comprising: monitoring a plurality of synchronization signal resources, each synchronization signal resource of the plurality of synchronization signal resources associated with a beam of a set of beams; determining, based at least in part on the monitoring, that multiple candidate beams of the set of beams satisfy a channel quality threshold; transmitting, as part of a random access procedure with a base station, an indication that the multiple candidate beams satisfy the channel quality threshold; receiving, based at least in part on transmitting the indication, an indication of a first beam of the multiple candidate beams; and establishing a connection with the base station via the first beam.

Aspect 2: The method of aspect 1, wherein transmitting the indication that the multiple candidate beams satisfy the channel quality threshold comprises: identifying a random access resource associated with the multiple candidate beams of the set of beams; and transmitting, as part of the random access procedure with the base station, a first random access message on the identified random access resource.

Aspect 3: The method of any of aspects 1 through 2, further comprising: receiving, based at least in part on the monitoring, one or more synchronization signals over the plurality of synchronization signal resources; and performing one or more channel quality measurements on the one or more synchronization signals, wherein determining that the multiple candidate beams of the set of beams satisfy the channel quality threshold is based at least in part on performing the one or more channel quality measurements.

Aspect 4: The method of aspect 3, further comprising: identifying, based at least in part on performing the one or more channel quality measurements, a first channel quality measurement value for the first beam of the multiple candidate beams; identifying, based at least in part on performing the one or more channel quality measurements, a second channel quality measurement value for a second beam of the multiple candidate beams, wherein the second channel quality measurement value is less than the first channel quality measurement; and determining that a difference between the first channel quality measurement value and the second channel quality measurement value satisfies a channel quality difference threshold, wherein determining that the multiple candidate beams of the set of beams satisfy the channel quality threshold is based at least in part on determining that the difference between the first channel quality measurement value and the second channel quality measurement value satisfies the channel quality difference threshold.

Aspect 5: The method of aspect 4, further comprising: identifying, based at least in part on performing the one or more channel quality measurement, a third channel quality measurement value for a third beam of the set of beams; determining that a difference between the first channel quality measurement value and the third channel quality measurement value does not satisfy the channel quality difference threshold; and determining, based at least in part on determining that the third channel quality measurement value does not satisfy the channel quality difference threshold, that the third beam of the set of beams is not one of the multiple candidate beams of the set of beams that satisfy a signal quality threshold measurement value.

Aspect 6: The method of any of aspects 3 through 5, wherein the one or more channel quality measurements comprise reference signal received power (RSRP) measurements, reference signal received quality (RSRQ) measurements, or a combination thereof.

Aspect 7: The method of any of aspects 1 through 6, wherein transmitting the indication that the multiple candidate beams satisfy the channel quality threshold comprises: identifying a first random access resource associated with the first beam of the multiple candidate beams; transmitting a first random access message on the identified first random access resource; identifying a second random access resource associated with a second beam of the multiple candidate beams; and transmitting a second random access message on the identified second random access resource.

Aspect 8: The method of aspect 7, wherein receiving the indication of the first beam of the multiple candidate beams comprises: receiving, using the first beam, a first random access response message associated with the first random access message; and ignoring, based at least in part on receiving the first random access response message, a second random access response message associated with the second random access message.

Aspect 9: The method of any of aspects 7 through 8, further comprising: determining that the UE is operating in a time-division duplex mode, wherein transmitting the first random access message on the identified first random access resource and transmitting the second random access message on the identified second random access resource is based at least in part on determining that the UE is operating in the time-division duplex mode.

Aspect 10: The method of any of aspects 1 through 9, wherein receiving the indication of the first beam of the multiple candidate beams comprises: receiving, as part of the random access procedure with the base station, a random access response message using the first beam.

Aspect 11: The method of any of aspects 1 through 10, further comprising: receiving, from the base station, a configuration message indicating one or more random access resources on which to transmit the indication that the multiple candidate beams satisfy the channel quality threshold.

Aspect 12: A method for wireless communications at a base station, comprising: transmitting one or more synchronization signals over a plurality of synchronization signal resources, each synchronization signal resource of the plurality of synchronization signal resources associated with a transmit beam of a set of transmit beams; receiving, as part of a random access procedure with a UE, an indication that multiple candidate beams of the set of transmit beams satisfy a channel quality threshold; transmitting, based at least in part on receiving the indication, an indication of a first beam of the multiple candidate beams; and establish a connection with the UE via the first beam.

Aspect 13: The method of aspect 12, wherein receiving the indication that multiple candidate beams of the set of transmit beams satisfy the channel quality threshold comprises: identifying a random access resource associated with the multiple candidate beams of the set of transmit beams; and receiving, as part of the random access procedure with the UE, a first random access message on the identified random access resource.

Aspect 14: The method of any of aspects 12 through 13, wherein receiving the indication that multiple candidate beams of the set of transmit beams satisfy the channel quality threshold comprises: receiving a first random access message on the first beam of the multiple candidate beams; and receiving a second random access message on a second beam of the multiple candidate beams.

Aspect 15: The method of any of aspects 12 through 14, wherein transmitting the indication of the first beam of the multiple candidate beams comprises: transmitting, as part of the random access procedure, a random access response message using the first beam.

Aspect 16: The method of any of aspects 12 through 15, further comprising: transmitting, to the UE, a configuration message indicating one or more random access resources on which to receive the indication that the multiple candidate beams satisfy the channel quality threshold.

Aspect 17: An apparatus for wireless communications at a UE, comprising at least one processor; memory coupled with the at least one processor; and instructions stored in the memory and executable by the at least one processor to cause the apparatus to perform a method of any of aspects 1 through 11.

Aspect 18: An apparatus for wireless communications at a UE, comprising at least one means for performing a method of any of aspects 1 through 11.

Aspect 19: A non-transitory computer-readable medium storing code for wireless communications at a UE, the code comprising instructions executable by at least one processor to perform a method of any of aspects 1 through 11.

Aspect 20: An apparatus for wireless communications at a base station, comprising at least one processor; memory coupled with the at least one processor; and instructions stored in the memory and executable by the at least one processor to cause the apparatus to perform a method of any of aspects 12 through 16.

Aspect 21: An apparatus for wireless communications at a base station, comprising at least one means for performing a method of any of aspects 12 through 16.

Aspect 22: A non-transitory computer-readable medium storing code for wireless communications at a base station, the code comprising instructions executable by at least one processor to perform a method of any of aspects 12 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with at least one general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or at least one general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    monitoring a plurality of synchronization signal resources, each synchronization signal resource of the plurality of synchronization signal resources associated with a beam of a set of beams;
    transmitting, as part of a random access procedure with a network device, a first random access message comprising a preamble via a random access resource in accordance with multiple candidate beams of the set of beams satisfying a channel quality threshold, wherein transmission of the first random access message comprising the preamble via the random access resource indicates that the multiple candidate beams satisfy the channel quality threshold;
    receiving, based at least in part on transmitting the first random access message, an indication of a first beam of the multiple candidate beams; and
    establishing a connection with the network device via the first beam.

2. The method of claim 1, further comprising:
    receiving, based at least in part on the monitoring, one or more synchronization signals over the plurality of synchronization signal resources; and performing one or more channel quality measurements on the one or more synchronization signals, wherein determining that the multiple candidate beams of the set of beams satisfy the channel quality threshold is based at least in part on performing the one or more channel quality measurements.

3. The method of claim 2, further comprising:
identifying, based at least in part on performing the one or more channel quality measurements, a first channel quality measurement value for the first beam of the multiple candidate beams;
identifying, based at least in part on performing the one or more channel quality measurements, a second channel quality measurement value for a second beam of the multiple candidate beams, wherein the second channel quality measurement value is less than the first channel quality measurement value; and
determining that a difference between the first channel quality measurement value and the second channel quality measurement value satisfies a channel quality difference threshold, wherein determining that the multiple candidate beams of the set of beams satisfy the channel quality threshold is based at least in part on determining that the difference between the first channel quality measurement value and the second channel quality measurement value satisfies the channel quality difference threshold.

4. The method of claim 3, further comprising:
identifying, based at least in part on performing the one or more channel quality measurements, a third channel quality measurement value for a third beam of the set of beams;
determining that a difference between the first channel quality measurement value and the third channel quality measurement value does not satisfy the channel quality difference threshold; and
determining, based at least in part on determining that the third channel quality measurement value does not satisfy the channel quality difference threshold, that the third beam of the set of beams is not one of the multiple candidate beams of the set of beams that satisfy a signal quality threshold measurement value.

5. The method of claim 2, wherein the one or more channel quality measurements comprise reference signal received power (RSRP) measurements, reference signal received quality (RSRQ) measurements, or a combination thereof.

6. The method of claim 1, wherein receiving the indication of the first beam of the multiple candidate beams comprises:
receiving, as part of the random access procedure with the network device, a random access response message using the first beam.

7. The method of claim 1, further comprising:
receiving, from the network device, a configuration message indicating one or more random access resources, the one or more random access resources comprising the random access resource via which the first random access message is transmitted to indicate that the multiple candidate beams satisfy the channel quality threshold.

8. A method for wireless communications at a network device, comprising:
transmitting one or more synchronization signals over a plurality of synchronization signal resources, each synchronization signal resource of the plurality of synchronization signal resources associated with a transmit beam of a set of transmit beams;
receiving, as part of a random access procedure with a user equipment (UE), a first random access message comprising a preamble via a random access resource in accordance with multiple candidate beams of the set of transmit beams satisfying a channel quality threshold at the UE, wherein reception of the first random access message comprising the preamble via the random access resource indicates that the multiple candidate beams satisfy the channel quality threshold;
transmitting, based at least in part on receiving the first random access message, an indication of a first beam of the multiple candidate beams; and
establishing a connection with the UE via the first beam.

9. The method of claim 8, wherein transmitting the indication of the first beam of the multiple candidate beams comprises:
transmitting, as part of the random access procedure, a random access response message using the first beam.

10. The method of claim 8, further comprising:
transmitting, to the UE, a configuration message indicating one or more random access resources, the one or more random access resources comprising the random access resource via which the first random access message is received to indicate that the multiple candidate beams satisfy the channel quality threshold.

11. A user equipment (UE), comprising:
one or more processors; and
one or more memories coupled with the one or more processors and storing instructions executable by the one or more processors to cause the UE to:
monitor a plurality of synchronization signal resources, each synchronization signal resource of the plurality of synchronization signal resources associated with a beam of a set of beams;
transmit, as part of a random access procedure with a network device, a first random access message comprising a preamble via a random access resource in accordance with multiple candidate beams of the set of beams satisfying a channel quality threshold, wherein transmission of the first random access message comprising the preamble via the random access resource indicates that the multiple candidate beams satisfy the channel quality threshold;
receive, based at least in part on transmitting the first random access message, an indication of a first beam of the multiple candidate beams; and
establish a connection with the network device via the first beam.

12. The UE of claim 11, wherein the instructions are further executable by the one or more processors to cause the UE to:
receive, based at least in part on the monitoring, one or more synchronization signals over the plurality of synchronization signal resources; and
perform one or more channel quality measurements on the one or more synchronization signals, wherein determining that the multiple candidate beams of the set of beams satisfy the channel quality threshold is based at least in part on performing the one or more channel quality measurements.

13. The UE of claim 12, wherein the instructions are further executable by the one or more processors to cause the UE to:

identify, based at least in part on performing the one or more channel quality measurements, a first channel quality measurement value for the first beam of the multiple candidate beams;

identify, based at least in part on performing the one or more channel quality measurements, a second channel quality measurement value for a second beam of the multiple candidate beams, wherein the second channel quality measurement value is less than the first channel quality measurement value; and determine that a difference between the first channel quality measurement value and the second channel quality measurement value satisfies a channel quality difference threshold, wherein determining that the multiple candidate beams of the set of beams satisfy the channel quality threshold is based at least in part on determining that the difference between the first channel quality measurement value and the second channel quality measurement value satisfies the channel quality difference threshold.

14. The UE of claim 13, wherein the instructions are further executable by the one or more processors to cause the UE to:

identify, based at least in part on performing the one or more channel quality measurements, a third channel quality measurement value for a third beam of the set of beams;

determine that a difference between the first channel quality measurement value and the third channel quality measurement value does not satisfy the channel quality difference threshold; and determine, based at least in part on determining that the third channel quality measurement value does not satisfy the channel quality difference threshold, that the third beam of the set of beams is not one of the multiple candidate beams of the set of beams that satisfy a signal quality threshold measurement value.

15. The UE of claim 12, wherein the one or more channel quality measurements comprise reference signal received power (RSRP) measurements, reference signal received quality (RSRQ) measurements, or a combination thereof.

16. The UE of claim 11, wherein the instructions to receive the indication of the first beam of the multiple candidate beams are executable by the one or more processors to cause the UE to:

receive, as part of the random access procedure with the network device, a random access response message using the first beam.

17. The UE of claim 11, wherein the instructions are further executable by the one or more processors to cause the UE to:

receive, from the network device, a configuration message indicating one or more random access resources, the one or more random access resources comprising the random access resource via which the first random access message is transmitted to indicate that the multiple candidate beams satisfy the channel quality threshold.

18. A network device, comprising:

one or more processors; and one or more memories coupled with the one or more processors and storing instructions executable by the one or more processors to cause the network device to:

transmit one or more synchronization signals over a plurality of synchronization signal resources, each synchronization signal resource of the plurality of synchronization signal resources associated with a transmit beam of a set of transmit beams;

receive, as part of a random access procedure with a user equipment (UE), a first random access message comprising a preamble via a random access resource in accordance with multiple candidate beams of the set of transmit beams satisfying a channel quality threshold at the UE, wherein reception of the first random access message comprising the preamble via the random access resource indicates that the multiple candidate beams satisfy the channel quality threshold;

transmit, based at least in part on receiving the first random access message, an indication of a first beam of the multiple candidate beams; and establish a connection with the UE via the first beam.

19. The method of claim 7, wherein the one or more random access resources further comprise a second random access resource that is associated with a second set of multiple candidate beams different than the multiple candidate beams associated with the random access resource.

20. The method of claim 10, wherein the one or more random access resources further comprise a second random access resource that is associated with a second set of multiple candidate beams different than the multiple candidate beams associated with the random access resource.

21. The UE of claim 17, wherein the one or more random access resources further comprise a second random access resource that is associated with a second set of multiple candidate beams different than the multiple candidate beams associated with the random access resource.

* * * * *